United States Patent [19]
Loewenthal et al.

[11] Patent Number: 5,712,922
[45] Date of Patent: Jan. 27, 1998

[54] NEURAL NETWORK OPTICAL CHARACTER RECOGNITION SYSTEM AND METHOD FOR CLASSIFYING CHARACTERS IN A MOVING WEB

[75] Inventors: Kenneth H. Loewenthal, Rochester; Steven M. Bryant, Holley, both of N.Y.

[73] Assignee: Eastman Kodak Company, Rochester, N.Y.

[21] Appl. No.: 340,270

[22] Filed: Nov. 15, 1994

Related U.S. Application Data

[63] Continuation-in-part of Ser. No. 868,372, Apr. 14, 1992, abandoned.

[51] Int. Cl.$^6$ .............................. G06K 9/62; G06F 7/38; G06F 15/18
[52] U.S. Cl. ...................... 382/155; 382/157; 364/736; 395/24
[58] Field of Search .............................. 382/155, 157, 382/161; 395/22, 23, 24, 27; 364/513, 274.9, 736

[56] References Cited

U.S. PATENT DOCUMENTS

| | | | |
|---|---|---|---|
| H681 | 9/1989 | Weideman | 382/11 |
| 4,414,685 | 11/1983 | Sternberg | 382/49 |
| 4,680,805 | 7/1987 | Scott | 382/22 |

(List continued on next page.)

FOREIGN PATENT DOCUMENTS

| | | | |
|---|---|---|---|
| 0 288 322 | 7/1986 | European Pat. Off. | G06F 19/63 |
| 3152406 | 10/1991 | Japan | G06K 9/46 |

OTHER PUBLICATIONS

J. Mody and C. Darken, "Learning with Localized Receptive Fields," Proceedings of the 1988 Connectionist Models Summer School, Jun. 1988.

Rumelhart, D.E. and McClelland, J.L., "Learning Internal Representations by Error Propagation," *Parallel Distributed Processing: Explorations in the Microstructure of Cognition*, I & II vol. I, 318–364, MIT Press, Cambridge, MA, 1986.

Hecht–Neilsen, R., "The Backpropagation Neural Network," *Neurocomputing*, 124–138, Addison–Wesley, Reading, MA, 1990.

Lippmann, R.P. "An Introduction to Computing with Neural Nets," IEEE ASSP Magazine, Apr. 1987.

R. Beale and T. Jackson, *Neural Computing: An Introduction*, Adam Hilger imprint by IOP Publishing, Ltd., pp. 7–74, 83–89, 219–221, (1990).

Gorman, C., "Putting Brainpower in a Box," *TIME*, p. 59, Aug. 3, 1988.

(List continued on next page.)

*Primary Examiner*—Andrew Johns
*Assistant Examiner*—Monica S. Davis
*Attorney, Agent, or Firm*—Clyde E. Bailey, Sr.; Charles E. Snee, III

[57] ABSTRACT

A neural network based optical character recognition technique is presented for identifying characters in a moving web. Image acquisition means defines an imaging window through which the moving web passes such that the characters printed thereon can be imaged. Classification data is extracted and accumulated for each printed web character passing through the imaging window. A light source provides transmissive illumination of the web as it is being imaged. A neural network accelerator is coupled to the image acquisition means for intelligent processing of the accumulated classification data to produce therefrom printed character classification information indicative of each corresponding character imaged. A processor is coupled to the accelerator for converting the classification information into the appropriate ASCII character code. The technique is particularly useful for reading dot-matrix-type characters on a noisy, semi-transparent background at fast real-time rates. A neural network algorithm based recognition method is also described.

36 Claims, 13 Drawing Sheets

U.S. PATENT DOCUMENTS

| | | | |
|---|---|---|---|
| 4,932,065 | 6/1990 | Feldgajer | 382/9 |
| 4,974,169 | 11/1990 | Engel | 364/513 |
| 4,994,982 | 2/1991 | Duranton et al. | 364/513 |
| 5,014,327 | 5/1991 | Potter et al. | 382/14 |
| 5,040,229 | 8/1991 | Lee et al. | 382/9 |
| 5,048,097 | 9/1991 | Gaborski et al. | 382/14 |
| 5,048,100 | 9/1991 | Kuperstein | 382/36 |
| 5,052,043 | 9/1991 | Gaborski | 395/23 |
| 5,054,094 | 10/1991 | Barski | 382/18 |
| 5,060,278 | 10/1991 | Fukumizu | 382/14 |
| 5,067,164 | 11/1991 | Denker | 382/15 |
| 5,068,799 | 11/1991 | Jarrett, Jr. | 382/31 |
| 5,105,387 | 4/1992 | Childers et al. | 365/189.03 |
| 5,165,009 | 11/1992 | Watnabe et al. | 395/27 |
| 5,194,958 | 3/1993 | Pearman et al. | 358/214 |
| 5,204,914 | 4/1993 | Mason et al. | 382/161 |
| 5,267,185 | 11/1993 | Akabane et al. | 364/736 |
| 5,329,630 | 7/1994 | Baldwin | 395/425.8 |
| 5,398,300 | 3/1995 | Levey | 395/22 |
| 5,426,745 | 6/1995 | Baji et al. | 395/22 |
| 5,434,951 | 7/1995 | Kuwata | 395/24 |
| 5,465,375 | 11/1995 | Thepaut et al. | 395/800 |
| 5,504,838 | 4/1996 | Furuta et al. | 395/27 |
| 5,506,915 | 4/1996 | Takstori et al. | 395/24 |
| 5,553,196 | 9/1996 | Takatori et al. | 395/24 |

OTHER PUBLICATIONS

"Window on Silicon Valley," *California Technology Stock Letter*, pp. 10–15, Aug. 26, 1988.

Caudill, M., "Humanly Inspired," *Unix Review*, vol. 7 No. 5, 41–47, May 1989.

"A Neural Network Approach to Machine Vision Systems for Automated Industrial Inspection", Tai–Hoon Cho; International Joint Conference on Neural Networks, Jul. 8–12, 1991; pp. I-205–I-208.

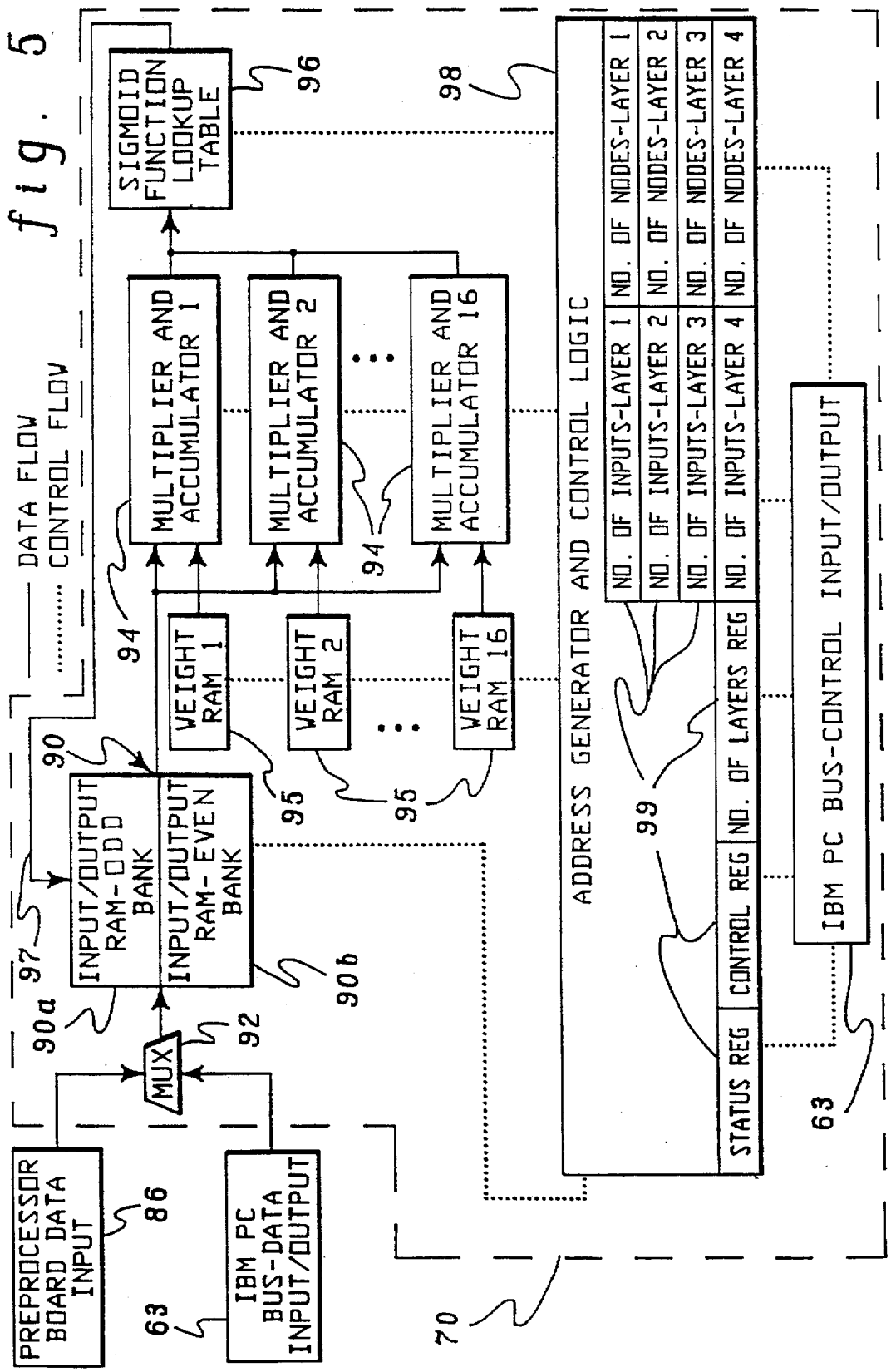

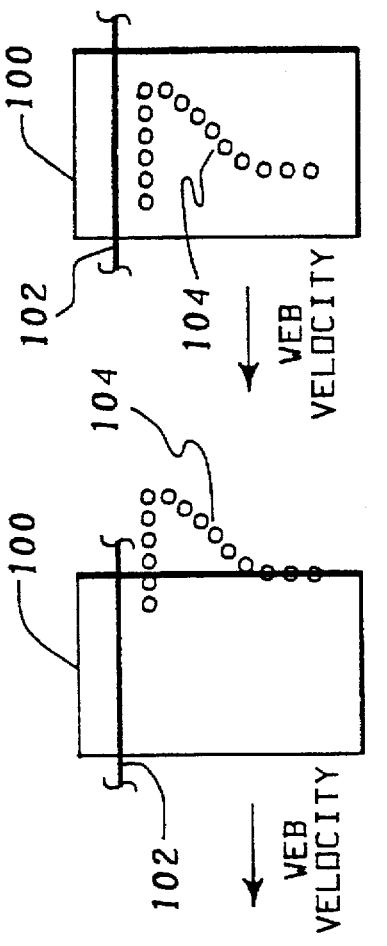
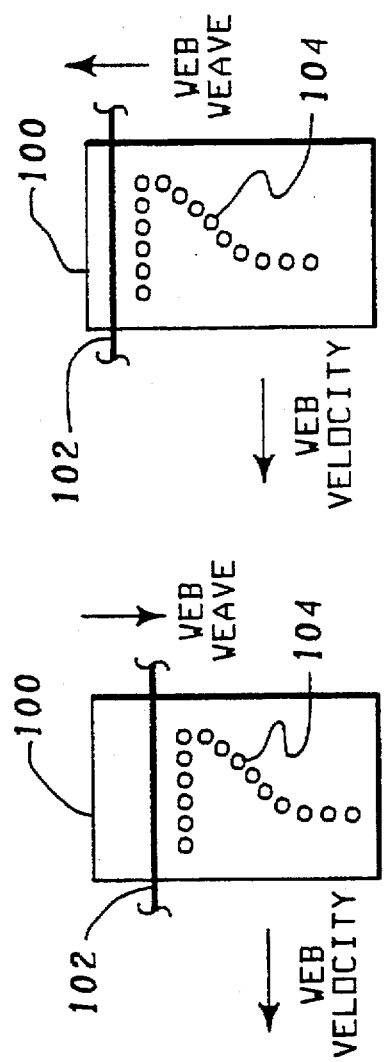
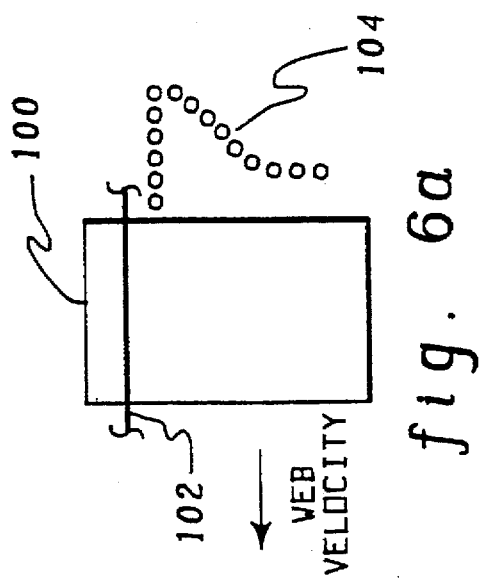
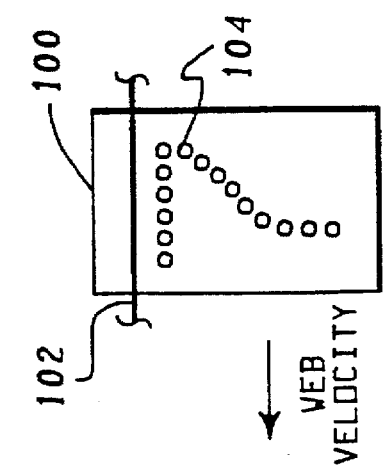

N1 = NO. OF INPUTS TO LAYER 1

N2 = NO. OF OUTPUTS IN LAYER 1

NK = NO. OF INPUTS TO LAYER K

M1 = NO. OF NODES IN LAYER 1

M2 = NO. OF NODES IN LAYER 2

MK = NO. OF NODES IN LAYER K

K = TOTAL NO. OF LAYERS

| |
|---|
| LAYER 1 NODE 1 WEIGHT 1 <br> LAYER 1 NODE 1 WEIGHT 2 <br> ⋮ <br> LAYER 1 NODE 1 WEIGHT N1 |
| LAYER 1 NODE 17 WEIGHT 1 <br> LAYER 1 NODE 17 WEIGHT 2 <br> ⋮ <br> LAYER 1 NODE 17 WEIGHT N1 |
| LAYER 1 NODE (1+M1*16) WEIGHT 1 <br> LAYER 1 NODE (1+M1*16) WEIGHT 2 <br> ⋮ <br> LAYER 1 NODE (1+M1*16) WEIGHT N1 |
| LAYER 2 NODE 1 WEIGHT 1 <br> LAYER 2 NODE 1 WEIGHT 2 <br> ⋮ <br> LAYER 2 NODE 1 WEIGHT N2 |
| LAYER 2 NODE 17 WEIGHT 1 <br> LAYER 2 NODE 17 WEIGHT 2 <br> ⋮ <br> LAYER 2 NODE 17 WEIGHT N2 |
| ⋮ |
| LAYER 2 NODE (1+M1*16) WEIGHT 1 <br> LAYER 2 NODE (1+M1*16) WEIGHT 2 <br> ⋮ <br> LAYER 2 NODE (1+M1*16) WEIGHT N2 |
| LAYER K NODE 1 WEIGHT 1 <br> LAYER K NODE 1 WEIGHT 2 <br> ⋮ <br> LAYER K NODE 1 WEIGHT NK |
| LAYER K NODE 17 WEIGHT 1 <br> LAYER K NODE 17 WEIGHT 2 <br> ⋮ <br> LAYER K NODE 17 WEIGHT NK |
| LAYER K NODE (1+M1*16) WEIGHT 1 <br> LAYER K NODE (1+M1*16) WEIGHT 2 <br> ⋮ <br> LAYER K NODE (1+M1*16) WEIGHT NK | fig. 8

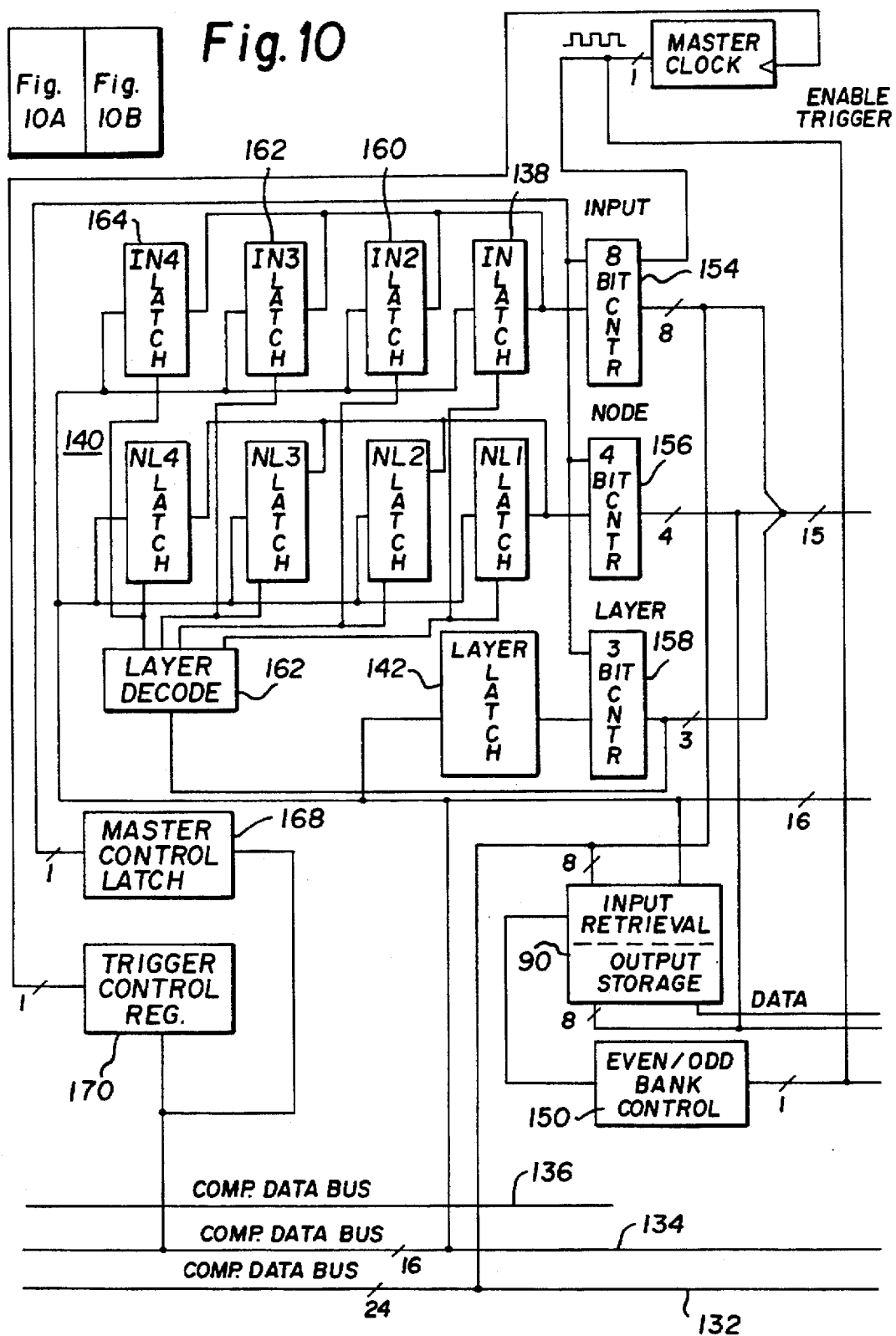

NEURAL NETWORK OPTICAL CHARACTER RECOGNITION SYSTEM AND METHOD FOR CLASSIFYING CHARACTERS IN A MOVING WEB

This application is a continuation-in-part of U.S. Ser. No. 07/868,372 filed on Apr. 14, 1992, now abandoned.

BACKGROUND OF THE INVENTION

1. Technical Field

The invention relates in general to the field of optical character recognition and, in particular, to an optical character recognition system and method employing a neural network algorithm to recognize edgemarked characters on a moving web of semi-transparent or transparent material.

2. Background Art

Edgemarking involves printing characters, both human and machine readable, in the form of an identification number on a lengthwise edge of a film base or web. The web may be a nonphotographic or photographic material, such as acetate or Estar® film base. One typical implementation is to laser print edgemarks composed of a series of characters consisting of a registration mark, along with incremental roll numbers and footage numbers. In the photographic film industry, for example, edgemarks may be printed in various predefined lengths on one edge of the semi-transparent film base during the manufacturing process. Edgemarks are used in the film manufacturing industry to provide "built-in" roll identification which permits verification of roll identity and imperfection location during the different stages of the manufacturing process. Edgemarks may be superimposed partially or entirely over knurling sections often disposed along the edges of the film base. Various edgemarking systems are described by way of example in U.S. Pat. Nos: 4,854,696; 4,865,872; 4,508,438; 4,519,701; and 4,548,492.

Conventional document processing systems are designed to optically read printed black information on a white background. Also, optical character recognition (OCR) technic are utilized in the known art for distinguishing between different print fonts and for identifying particular individual characters. (As used herein, the word "characters" is to include numeric and alphanumeric characters, as well as bar code data or other similar indicia.) Characters may be printed in a continuous format, typically referred to as continuous print, or in a dot matrix print format in which and columns of dots define the characters.

Since character recognition involves numerous parameters associated with a character, whether a character is contiguous or represent, by dot matrix print is an important piece of information in recognizing the character. Various feature recognition algorithms are available for optical character recognition of characters. In addition, different masks for recognition are often utilized to recognize dot matrix print. In general, recognition of dot matrix print is more difficult than recognition of continuous-type characters because of the broken nature of the characters.

Another complication in recognizing dot matrix characters often arises from the web material on which the characters are printed. As already noted, in the photographics material industry, for example, dot matrix characters may be imposed Estar® and/or acetate film webs. Thus, the resultant characters (whether continuous-type or dot matrix type) are typically not of the same quality as black characters on white paper. At best, state-of-the-art optical character recognition (OCR) techniques for black characters on white paper perform marginally when used to read continuous-type characters on such poor quality background material as found on Estar® and acetate film webs. Further, optical character recognition of highly aberrated laser printed dot matrix characters on semi-transparent Estar® and acetate webs using available techniques is in practice simply unworkable. Since dot matrix print is discontinuous at numerous locations (and possibly even imposed in a transparent or semi-transparent form), it provides considerably greater recognition problems than standard black characters on white paper. Additional problems obviously can relate to the "noisy" nature of the material on which the characters are printed, e.g., due to knurling at the edge of the web.

Since OCR devices on the market today generally do not adequately operate on dot matrix-type print (or even continuous-type print) on semi-transparent, noisy background material, a new artificial neural network approach to recognition of such characters is proposed herein. Neural networks are massively parallel neuron-type elements that are interconnected in a specific manner to provide, but not limited to, OCR, pattern recognition, machine learning, process control and voice recognition. The most common structures in artificial neural network systems are networks of non-linear processing elements, where "nodes" are interconnected to a plurality of inputs through information channels or "weights." Each node can process multiple inputs and weights and each has one output signal. The networks can often have multiple layers, wherein layers subsequent to the first layer receive inputs from the outputs of the previous layer. The last layer in the network generally provides the output stimulus.

Neural networks can simulate, on a very basic level, the features of biological nervous systems. Many of the advantages of biological nervous systems include: the ability to generalize, adapt and deal with a wide degree of latitude and environments, operate on a massively parallel form to effectively function at real time rates, fault tolerance or the ability to deal with errors internal to the network itself, the ability to learn by example. Neural networks do require training before useful results can be obtained. However, in many applications, one-time batch back-propagation training of a network is sufficient. When trained, the resultant "weights" are stored and retrieved for later use in a non-training, testing mode or "forward mode" operation.

Disclosed herein is a neural network based optical character recognition technique for recognition of characters, either continuous or dot matrix print characters, on a moving noisy web background (such as Estar® and acetate webs) in real time.

SUMMARY OF THE INVENTION

Briefly described, the present invention comprises in one aspect a novel neural network optical character recognition system for extracting and classifying characters disposed on a moving web of material. The system includes an image acquisition means which defines an imaging window through which the moving web of material is passed. The image acquisition means extracts and accumulates image data on each printed web character passing through the imaging window. A light source is provided for illuminating the web as the web passes through the defined imaging window. A neural network accelerator board is coupled to the image acquisition means for processing accumulated image data on each web character passing through the imaging window. This processing is accomplished according to a predefined neural network algorithm. The network accelerator produces, from the image data, printed character classification information. Classification means, coupled to the neural network accelerator, then definitively classifies each printed web character image using the corresponding printed character classification information produced by the neural network accelerator.

Preferably, the neural network accelerator used within the recognition system comprises a novel neural network accelerator board which implements a predefined, multilayer neural network back-propagation-type algorithm. The board includes storage means divided into a first portion and a second portion, with input data being initially held within the first portion thereof. A plurality of parallel connected processing nodes are coupled thereto, each with access to both portions of the memory storage. Each processing node is also connected so as to send its output data to either the first portion or second portion of the dual-ported memory. In the first layer of the multilayer back-propagation-type neural network, output data from the plurality of parallel connected processing nodes is stored to the second portion of the dual-ported memory. After first layer processing, switching means is activated to couple the second portion memory to an input of each of the plurality of parallel connected processing nodes such that the data stored therein can then be used for second layer processing according to the network algorithm. In the second layer, output data from the processing nodes is overwritten into the first portion of the dual-ported memory. The storage and retrieval of data continues to alternate between the first portion and second portion of memory storage until all layers of the multilayer neural network algorithm have been processed. This technique results in extremely fast processing, high throughput, flexibility in structuring neural networks, and reductions in hardware cost, space and energy consumption. Further specific enhancements to the recognition system are also described and claimed herein.

In another aspect, a method for extracting and classifying characters disposed on a moving web of material using a neural network is presented. The method includes: passing the moving web through a predefined imaging window and simultaneous therewith, illuminating the web within the window; acquiring an image of the web within the imaging window as the web passes therethrough; extracting and accumulating image data on any characters disposed in the imaged web; and using a predefined neural network to process the accumulated image data, and produced therefrom character classification information. Preferably, this classification information is then converted to ASCII code for storage, transmission to an external system and/or display. As with the system, specific enhanced process steps are also described and claimed herein.

To summarize, a novel character recognition system and method are set forth which employ a neural network to recognize edgemarked characters on a moving web of material. The technique described can identify highly aberrated dot-matrix numeric characters on a moving web of transparent or semi-transparent material, e.g., Estar® or acetate material. Further, a novel neural network accelerator board is presented, which is capable of significantly enhanced performance over any hereto known accelerator board, in addition to obviously providing improved performance over any software based character recognition implementation. Presented is a practical neural network application to the recognition of edgemarked characters on a moving web. Using the technique, characters can be properly recognized notwithstanding that they may be of such poor quality as to be unrecognizable to the naked eye. The system and method described operate in real time on the generated data. Because the technique is based on a neural network, the system/method are able to: generalize; adapt and deal with a wide degree of latitude in environments; operate in a massively parallel form to effectively operate in real time rates; provide fault tolerance, or the ability to deal with errors internal to the network itself; and learn by example.

BRIEF DESCRIPTION OF THE DRAWINGS

These and other objects, advantages and features of the present invention will be more readily understood from the following detailed description of certain preferred embodiments thereof, when considered in conjunction with the accompanying drawings in which:

FIG. 5 is a block diagram representation of one embodiment of the neural network accelerator board of FIG. 3;

FIGS. 6(a)–6(c) depict the progression of a character on the moving web through a defined imaging window in a neural network optical character recognition system pursuant to the present invention;

FIGS. 7(a)–7(c) depict different possible positions of the edgemarked web as the web passes through the defined imaging window;

FIG. 8 depicts one embodiment of stored weight information for one processing node in the neural network accelerator board embodiment of FIG. 5;

DESCRIPTION OF THE PREFERRED EMBODIMENTS

Reference is now made to the drawings in which the same reference numbers are used throughout the different figures to designate the same or similar components.

Figure 1:
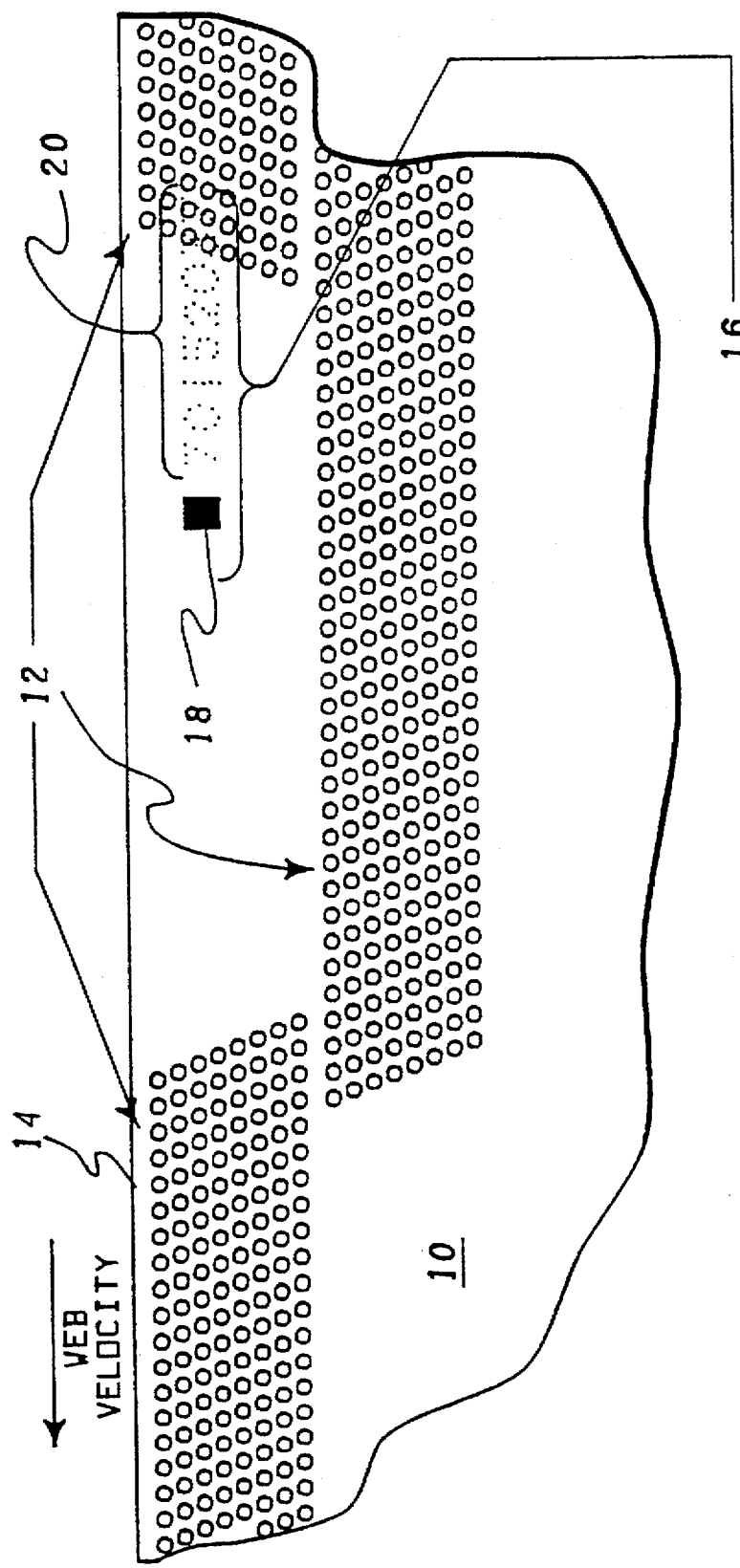
FIG. 1 is a partial plan view of a moving web of material having edgemarkings thereon to be extracted and classified pursuant to the present invention.

One partial embodiment of a continuously moving web of material, generally denoted 10, is depicted in FIG. 1. As noted above, web 10 can comprise any continuously moving web of nonphotographic material (such as paper) or photographic material, such as an acetate or Estar® film base. If the web comprises photographic material, a checkerboard embossed pattern or knurling 12 is typically used along an edge 14 of web 10. (Typically, with photographic material, no emulsion coating appears within a predefined distance from each lengthwise edge of the web, such that the web is semi-transparent near its edges. Knurling 12 is assumed to occur within this area.)

Web velocity is assumed to vary within a specified range (e.g., from standstill to 1,000 ft./Min.) and travel is from right to left. A lengthwise edgemark 16 is shown partially overlapping one section of knurling 12 such that both human and machine recognition of the overlapping characters is difficult. Dust, surface nonuniformities, and birefringence operate to further degrade the quality of a semi-transparent background material. In the depicted example, edgemark 16 includes a special registration mark 18 followed by a plurality of numeric characters 20, which may comprise a machine number, incremental roll numbers and/or footage number information.

Edgemarkings such as edgemark 16 are typically printed at equally spaced intervals along the edge of web 10. Proper identification or "classification" of the edgemarkings can be used as feedback information in a product control loop or process control loop. For example, edgemarks can permit direct verification of roll identity, along with an imperfection location during any state of the manufacturing process. In one preferred form of edgemarking, mark 16 consists of a $CO_2$ laser printed series of small elliptical pits of dot matrix-type characters; but various types of different equipment are available for focusing indicia on a preselected location of a continuously moving web. The description provided herein assumes a poor quality printing, which can be due partially or entirely to the noisy background material on which the characters are imposed, such that most, if not all, existing character recognition equipment produces unsatisfactory results. In the example described herein, it is assumed highly aberrated dot matrix characters on a moving Estar® web are to be located and classified. In such a case, the characters will typically be semi-transparent and the film base may be transparent or semi-transparent such that the unaided human eye may be unable to discern particular character classifications. However, relevant classification information still exists thereon which is able to be used by a neural network system constructed pursuant to the present invention to classify the characters.

Characters are defined to fall within certain numeric classifications such as "0, 1, 2, 3, 4, 5, 6, 7, 8, 9." Dot matrix numeric character images 16 can be printed very close to edge 14 of web 10. The character message format is assumed to be fixed and substantially constantly spaced along the edge of the web. The constant length between characters and constant size or characters are assumed known. Further the characters remain substantially constant in size, shape, and format and never overlap. However, the distance between messages can vary from message to message.

Figure 2:
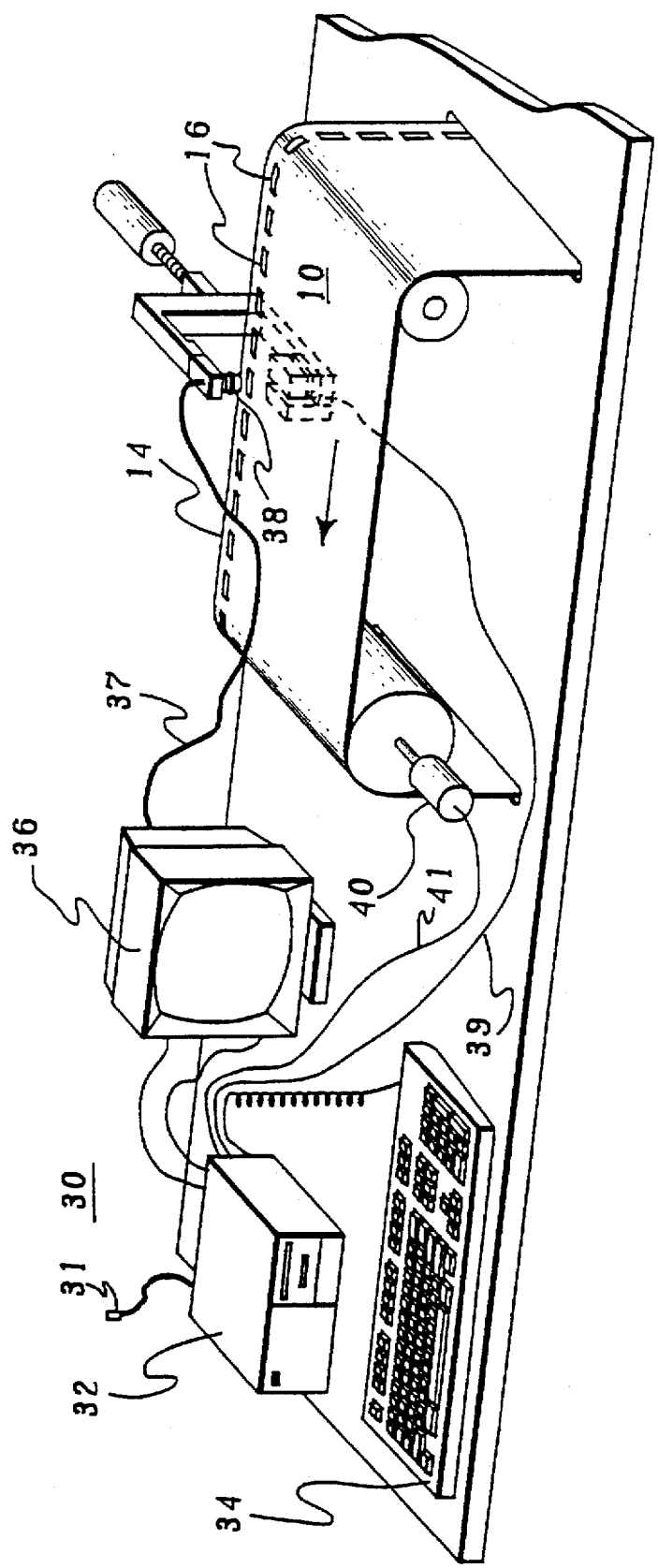
FIG. 2 is a simplified perspective view of one embodiment of a neural network optical character recognition system pursuant to the present invention.

Referring to FIG. 2, one embodiment of a neural network based optical character recognition system, generally denoted 30, pursuant to the present invention is shown. Again, system 30 is designed to scan dot matrix numeric character images, which may be semi-transparent, in a moving continuous web of material 10, which itself may be transparent or semi-transparent. The system presented is capable of extracting and classifying specific characters which may be otherwise unrecognizable to the human eye. System 30 includes a computer 32 which, as described below, implements a neural network pursuant to the present invention. Computer 32 may include standard input interface means, such as a keyboard 34 or a touch screen (not shown), and output interface means, such as a video display 36 and/or a serial port 31. System 30 also includes a camera 38, which preferably comprises a CCD line scan camera, appropriately positioned over edge 14 of web 10 so as to image edgemarkings 16 thereon. A transmissive illumination source (not shown) is disposed below the moving web, and an encoder 40 is also provided. Camera 38, the illumination source, and encoder 40 are each coupled back to computer 32 by appropriate line connects 37, 39, 41, respectively.

Figure 3:
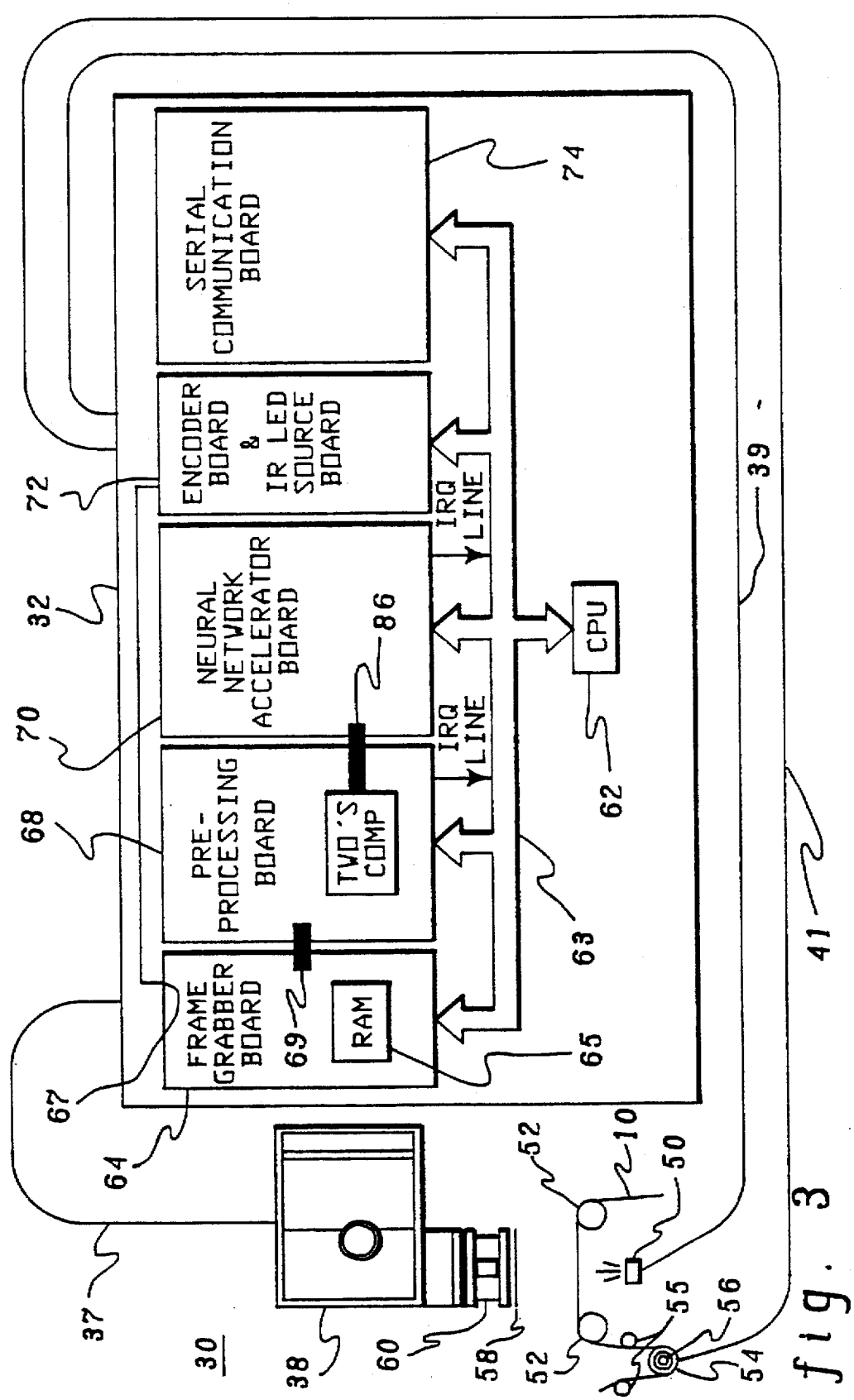
FIG. 3 is a more detailed block diagram representation of certain features of the neural network optical character recognition system of FIG. 2.

Certain of the various hardware components to system 30 are depicted in somewhat greater detail in FIG. 3. An infrared illumination source 50 is shown to transmissively illuminate moving continuous web 10. Web illumination occurs within an imaging window defined as a imaging window of line scan camera 38. The web transport system, includes rollers 52 for moving web 10 orthogonal to the imaging window of camera 38. Camera 38 is positioned with a tracking system (not shown) along the appropriate edge of web 10 for imaging edgemarkings. The web is propelled at an unknown, varying velocity using a servo motor (not shown) on the transport system. The web wraps around several rollers including a 270° optical shaft encoder roller 54. This roller's axis 56 is attached to a rotary optical shaft encoder (not shown.) The optical shaft encoder may have a resolution of 20,000 pulses per revolution and is used pursuant to the present invention to monitor web 10 motion or travel.

As also shown in FIG. 3, system 30 includes a white light filter 58 (which allows only IR light to pass) disposed proximate to a viewing lens 60 on CCD camera 38. A spatial slip filter (not shown) is preferably mounted directly below filter 58. Computer 32, in addition to standard computing components such as a CPU 62 and a PC data/control bus 63, includes pursuant to the present invention a frame grabber board 64 (which is coupled to camera 38 by line connect 37), a preprocessing board 68, a neural network accelerator board 70, an encoder board 72, and a serial communication board 74. Boards 64, 68, 70, 72 & 74 are each described in detail herein below.

The optical shaft encoder is coupled to encoder board 72 by interconnecting cable 41. As web 10 moves, encoder pulses are generated from the optical shaft encoder which are interfaced to encoder board 72 via line 41. Board 72 counts these pulses and when a pulse count of n (wherein n is a preprogrammed number of pulse counts) is reached (e.g., by decrementing a counter prestored with the value n), then the encoder board emits a trigger pulse to the frame grabber board 64 (i.e., line scan processing board). Should the web backup, board 72 is programmed to count the number of pulses in the reverse direction and add these to the counter to be decremented in order to correctly identify the next character location when the web later moves forward. The trigger pulse is received at an external trigger input 67. Board 64 then triggers camera 38 to capture and transmit to board 64 via external bus 37 a gray scale line image of the moving web comprising a predetermined number of pixels (e.g., 32 pixels). The resultant image is held in RAM 65 for transfer to preprocessing board 68, through a dedicated external bus 69, where each pixel of the line scan image is thresholded and converted into a 1-bit value.

Figure 4:
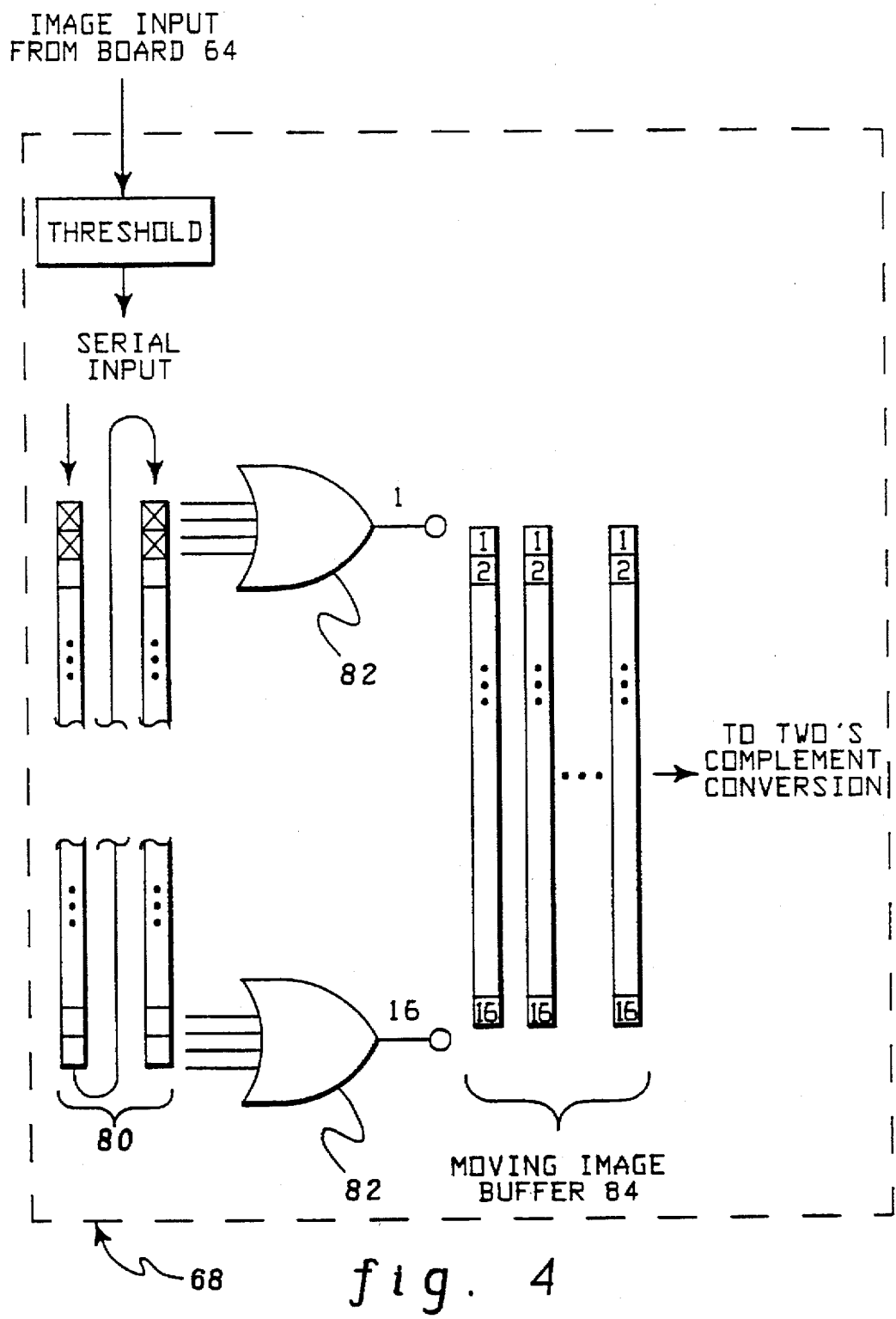
FIG. 4 is a more detailed representation of one embodiment of the preprocessing board of FIG. 3.

FIG. 4 depicts a preprocessing board 68 embodiment in greater detail.

As shown, after undergoing thresholding the imaged pixel value is pushed into a 64 bit first-in first-out (FIFO) buffer 80. Buffer 80 comprises two 32-bit columns, each of which receives one of two adjacent, captured line scanned images. Once two line images are captured, thresholded and shifted into the 64 bit FIFO 80, data in the FIFO is simultaneously processed using sixteen parallel connected 4-input OR gates 82. In this way, scanned information is both dilated and compressed in one novel step. The resulting sixteen bits of data from OR gates 82 is pipelined into a sixteen bit wide by sixteen words deep memory array 84.

Memory array 84 acts like a moving window image buffer, also referred to as a pipelined RAM. If the contents of the array were to be displayed at a computer screen, a sixteen-column wide replica of the web would move as the web moves beneath the camera. Additional circuitry on the image preprocessing board then takes the entire sixteen by sixteen array and converts each bit into its scaled sixteen bit two's complement equivalent number. For example, if the bit is a 1 then it's treated as a 1024 such that its scaled 16 bit integer two's complement is 0000,0100,0000,0000. Alternately, if the bit is a 0 then it's treated as a negative 1024 and its scaled two's complement is 1111,1100,0000, 0000. As the conversion is accomplished, each result is sent either over a dedicated bus 86 or a main pc bus 63 to neural network accelerator board 70 (FIG. 3).

FIG. 5 depicts one embodiment of a neural network accelerator board 70 pursuant to the present invention. Each scaled two's complement number from the image preprocessing board (FIG. 3) is initially stored in consecutive order in a first portion of a dual port input RAM 90. (The first RAM portion comprises the even bank RAM portion of FIG. 5.) Information is transferred to RAM 90 via a MUX 92 which is coupled to receive signals from either dedicated data input line 86 or the PC bus—data input/output 63. Upon receiving all 256 bits of image data (i.e., the 16×16 array), a trigger signal is sent from the image preprocessing board 68 to the neural network accelerator board 70 to process and classify the input data image. As explained in detail below, neural network accelerator board 70 then performs a series of calculations, which according to the numeric character embodiment of the present invention, result in ten 16-bit output values, one for each digit 0-9. These output values are stored in one of the two RAM locations in memory 90 and are designated the network's output. The network output results are preferably read and decoded by a CPU 62 (FIG. 3) to a corresponding ASCII code. Table 1 sets forth one possible decode configuration. An alternate decode configuration would be a thresholded "winner take all approach." In such a decode configuration, the highest output value identifies the character provided that the majority of remaining output values are below $Hi_{13}$ Threshold. If all outputs are less than Hi_Thresh, then no character is deemed to have been identified.

TABLE 1

| Output | Input |
| --- | --- |
| If Output Zero ≥ Hi_Thresh and Outputs One through Nine < Lo_Thresh | Input Image is a Zero |
| If Output One ≥ Hi_Thresh and Outputs Zero and Two through Nine < Lo_Thresh | Input Image is a One |
| If Output Two ≥ Hi_Thresh and Outputs Zero, One and Three through Nine < Lo_Thresh | Input Image is a Two |
| If Output Three ≥ Hi_Thresh and Outputs Zero through Two and Four through Nine < Lo_Thresh | Input Image is a Three |

TABLE 1-continued

| Output | Input |
| --- | --- |
| If Output Four ≥ Hi_Thresh and Outputs Zero through Three and Five through Nine < Lo_Thresh | Input Image is a Four |
| If Output Five ≥ Hi_Thresh and Outputs Zero through Four and Six through Nine < Lo_Thresh | Input Image is a Five |
| If Output Six ≥ Hi_Thresh and Outputs Zero through Five and Seven through Nine < Lo_Thresh | Input Image is a Six |
| If Output Seven ≥ Hi_Thresh and Outputs Zero through Six and Eight through Nine < Lo_Thresh | Input Image is a Seven |
| If Output Eight ≥ Hi_Thresh and Outputs Zero through Seven and Nine < Lo_Thresh | Input Image is a Eight |
| If Output Nine ≥ Hi_Thresh and Outputs Zero through Eight < Lo_Thresh | Input Image is a Nine |
| If all outputs are ≤ Hi_Thresh or more than one output ≥ Lo_Thresh | No character has been decoded |
| If all outputs are ≥ Hi_Thresh | A Special Registration Character has been found and decoded |

Where Hi_Thresh and Lo_Thresh are empirically predetermined.

Assuming that no character is found, the system proceeds to capture additional line images from the web, process the images, pipeline and transfer each image window to the neural network accelerator board, trigger the board, and then decode the output to the board until a special message registration character 18 (FIG. 1) is found. Once character 18 is found, the location of each character image in a predefined character field message will be known. (Since each character on the web is preferably machine printed with a high degree of precision, the spacing between characters is assumed known and fixed.) This information can be used to determine the number of line scanned columns from the registration character at which each character in the edgemarking should lie.

After classification of a special registration character, in one embodiment, software can be used to set a special decode "holdoff" variable and a special "message length holdoff" variable. The "holdoff" variable contains the number of columns to the beginning of the first digit in the message, while the "message length holdoff" variable identifies the systems' present location within the message. Each time the camera system reads in a new line, and processes this line via the preprocessing board and neural network accelerator board, the holdoff variable is decremented. When the variable reaches zero, a character image should be centered within the imaging window and the corresponding information in the output layer of the neural network RAM 90 (FIG. 5) will be representative of the present character in the edgemarking. At that time, software preferably examines the neural network input RAM to determine if a character is nearly or completely present. If one is, then those skilled in the art will recognize that a minor window dithering adjustment can be made using a rectangular convolution to determine the exact location of the character within the window, and minor adjustments can also be made as necessary.

By way of example, FIGS. 6(a)-6(c) depict the right to left movement of an edgemarked character 104 into a camera defined imaging window 100. Web 104 includes an edge 102 of the web which is shown to remain at a substantially constant position through the web progression of FIGS. 6(a), 6(b), and 6(c). Use of the optical encoder (FIG. 3) as described-above ensures that data is processed when character 104 is within the viewing window 100, thereby maximizing the chance of successfully extracting and classifying the character. The neural network is also preferably trained to recognize web weave within the imaging window 100. In this regard, FIG. 7(a) depicts a preferred location for the passage of the web through an imaging window. FIGS. 7(b) & 7(c) depict down and up weaving, respectively, of the moving web within the imaging window. Preferably, the neural network is trained to recognize the subject character irrespective of its position within the imaging window. Because the web is moving, it's edge 102 may walk up or down within the imaging window. (The network is pretrained to recognize a character anywhere within the larger imaging window. It should be noted printed characters can weave relative to the web edge.)

Once a valid numeric character is decoded (and, e.g., the result sent to an I/O device coupled to system 30 (FIG. 3), such as a serial port and/or video (i.e., via serial communication board 74), a parallel port or disk drive, then the holdoff variable is reset to the number of known columns to the next character in the edgemark. If no character is decoded, then the holdoff variable is set to zero and the system proceeds to search for a next special message registration character 18 (FIG. 1). The processing loop continues until the system is ordered to terminate by a computer operator via the software interface.

Returning to FIG. 5, those knowledgeable in the art will observe that the neural network accelerator board presented is divided into multiple processing nodes. Node division is utilized so that several processors can operate on individual node calculations simultaneously. Once all processors (i.e., multiply/accumulators) have completed their respective node calculations, the results pass into a Sigmoid LUT (lookup table), from which data is written back to one side of the dual-port input/output memory RAM 90 and stored until all node calculations for a first layer of the multilayer back-propagation-type neural network algorithm are complete. Once the first layer nodes are calculated, those stored values are in turn used as inputs for a second layer of node calculations. The results of the second layer node calculations are then stored in the other of the odd/even memory spheres of the dual-ported input RAM 90. This alternating process is continued until the neural network "output layer" is reached. All arithmetic can be accomplished in 16-bit integer two's complement form. Using integer math allows inexpensive fast multipliers and accumulators to be used as the node processors. It is important to note that no improvement was found using floating point math during software emulation of the neural network in the forward mode, and even in training mode some researchers have reported successful training using only integer math with as few as four bits.

In this particular design, sixteen parallel processors are implemented, each processor calculating one node at a time. (For "output layer" network processing, only ten of the sixteen nodes are necessary since in the embodiment discussed herein only numeric characters (0–9) are assumed to exist in the edgemarkings, i.e., besides the special registration characters.) Each parallel processing node performs one input weight multiplication and addition to the respective accumulator on each clock cycle. A typical clock cycle may be 40 MHz. The particular design depicted includes capabilities for (but not limited to) a fully connected calculation, which is to say that each node in layer n+1 is connected via a weight to every node in layer n. In such an embodiment, forward mode calculation speed is determined to be on the order of 640 million interconnects per second.

The accelerator board is controlled by appropriately loading control registers 99 of an address and control logic circuit 98 in the network. One control register holds the number of layers in the network, "No. of Layers Register." At present, the number of network layers can go up to four (and with some limitations up to eight). For each layer, an I/O location holds the number of inputs for that layer and a separate I/O location holds the number of nodes, "No. of Input-Layer i," "No. of Nodes-Layer i," wherein i=1 . . . 4. This is most of the information necessary to define the structure of the network to the board.

Each processor has memory 95 associated with it to store the predetermined weight values for the respective layers of the back-propagation algorithm, i.e., weight RAM 1, weight RAM 2, . . . weight RAM 16. For the sake of convention, processing nodes are labeled as multiplier and accumulator 1, multiplier and accumulator 2 . . . multiplier and accumulator 16. After the first 16 nodes have been processed, the processing nodes will next operate on nodes 17 through 32 of the subject layer of the neural network. This process is repeated until all nodes in the given layer are processed. Thus, processor number 1 operates on nodes, 1, 17, 33, etc., while processor number 2 operates on nodes 2, 18, 34, etc. If a layer to be processed contains less than sixteen processing nodes or if less than sixteen nodes remain to be processed, then the results of the unneeded processors 94 are simply ignored. FIG. 8 depicts one embodiment for weight value storage for processing node 1. The weight memory is loaded from a low address to a high address in the order of weight, node and layer. Note that the node sequence jumps by 16 since there are 16 processing nodes in the network working in parallel.

There are two ways to load the input. The primary method of loading the input for character recognition is through the dedicated parallel input port 86 designed to interface to the preprocessor and network boards. This interface comprises a port where the preprocessor board supplies the 16 bit data, and the 12 bit address, along with a write pulse. The write occurs asynchronously with no handshaking. As a specific example, the input write from the preprocessor board can operate at 20 MHz. Multiplexer 92 of the neural network accelerator also allows for loading of the input RAM through the main PC bus 63. Once the input RAM is loaded, the accelerator board is triggered by a software start command or a hardware pulse.

The neural network accelerator board is composed of processing units that nonlinearly transform their summed, sixteen bit integer inputs. The connection strength, or weight, linking one unit to another unit can be a positive or negative sixteen bit integer, representing either an excitatory or an inhibitory influence of the first unit on the output of the second unit. Each unit also has a threshold which is subtracted from the summed input. The threshold is implemented as weight from a unit that has a fixed value of 1024 so that the same notation and learning algorithm can also be applied to the thresholds as well as the weights. The output of the ith unit is determined by first summing all of its inputs $$E_i = \sum_j w_{ij} * I_j$$

where $w_{ij}$ is the weight from the jth to the ith unit, and then applying a sigmoidal transformation:

$$p_i = P(E_i) = \tanh(E_i)$$

where tanh($E_i$) is implemented in a 15-bit sigmoid junction lookup table RAM.

The neural network accelerator board used is hierarchically arranged into multiple layers of nodes with information flowing through the network from the bottom to top.

After the processors have finished with the calculation of the $\Sigma w_{ij} * I_j$, the summation is presented to a lookup table 96 RAM to calculate a sigmoid function, such as the tanh function. (Sigmoid function lookup table 96 can be preprogrammed with any transfer function desired to operate on the node output.) The output result of the tanh lookup table is stored in the alternate portion of the dual-port input RAM which is not being used for the current layer of calculations. For example, when initial input is loaded into the even bank 90b of the input RAM 90, then once the first set of node calculations are complete the outputs will be stored at the starting address of the odd bank RAM 90a of RAM 90. Once the entire first layer node calculations are complete, the input shifts (toggles) to the odd RAM area and the completed nodes for the second layer are written back to the even bank 90b RAM. This alternating process continues until all final layer calculations are complete. Obviously, whether there are an odd number of layers or an even number of layers determines whether the final result is located in the high or even bank of the input RAM. Also note that this function requires that the input RAM space be at least twice the size of the largest number of single layer inputs to be stored. In many cases, the input layer of the network is found to be the largest layer in a neural network.

Any one of a number of ways can be used to determine whether a network has completed its calculations. A first and simplest way is to insert a delay longer than the maximum time for the accelerator board to calculate the network and then read the output. A second way is to monitor the network status port for a defined network completion bit, which would be set once the board has completed its calculations. As still another alternative, interrupt request lines on the board can be used to generate an interrupt driven software routine to read the output of the accelerator board.

The architecture of the Neural Network Accelerator Board including address generator and control logic circuitry 98 and a control program will now be described in detail with reference to FIGS. 10 and 11A–11D. The general purpose neural network accelerator board 70 is designed to accelerate the mathematical calculations of most neural network structures during the feed forward calculation. This board is not designed for the acceleration of the training mode of a neural network. This board is designed to work with most feed forward neural network structures that consist of multiple nodes, and multiple layers where each node consists of a simple sum of the products of the input values multiplied by a weight value. This means the network must consist of nodes that have the form of the equation shown below:

$$Y = f(\Sigma W_i * X_i),$$

where $X_i$ is an input and $W_i$ is the weight associated with the input, and Y is the output of a neural network node. The function f() is any nonlinear squashing function, such as Tanh.

The neural network accelerator board is designed to be used in conjunction with a computer system, such as an Intel based AT compatible personal computer. This board is meant to provide a complete feed forward neural network computation at speeds well in excess of what a microprocessor or digital signal processor board/system could provide. Prior to using this board a neural network must be trained using any basic training algorithm, such as the back-propagation algorithm. This training is done off line in a batch mode. Neural Works Professional II Plus for IBM ATs from NeuralWare, Inc. Pittsburgh Pa. is an example of a typical software program that can be used to train a neural network. The resultant weight file can then be interrogated and the weight values in this file can be downloaded to the accelerator board.

Figure 10B:
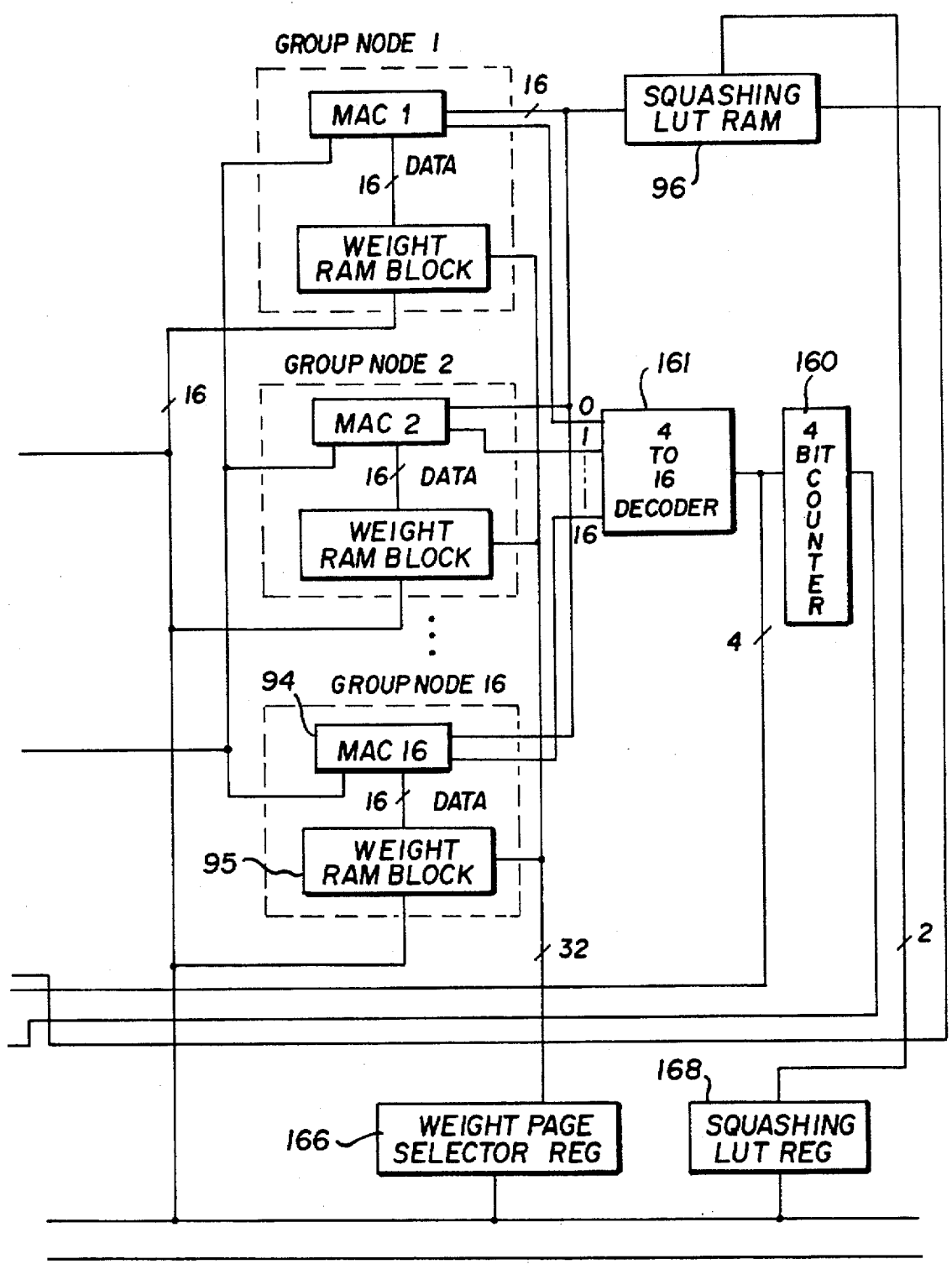
FIG. 10 is a block diagram representation of the neural network accelerator board showing further details of the address generator and control logic circuitry.

The board is designed to interface with the PC computer address bus 132, data bus 134, and control bus 136, as shown in FIG. 10. The board is designed to be fully software programmable and controllable. The board is loaded with specific neural network parameters by writing to the various registers (latches) and RAM using standard I/O and standard memory mapping software commands (such as out and mov). The Input 138, Node 140, Layer 142, and Control 144 registers are I/O decoded via the computer address bus. The Input RAM 90, Weight RAM 95 and Squashing Look-Up-Table (LUT) RAM 96 are all memory mapped via the computer address bus. The input RAM 90 consists of Dual Ported RAM chips, such as the IDT 7134 (Reference Integrated Device Technology High Performance CMOS Data Book 1988, Santa Clara Calif.) that are used as a pair of input banks, one even bank and one odd bank. The Neural Network accelerator board is a parallel processing system designed with 16 local processors that consist of a Multiplier Accumulator (MAC) 94 and two 32K×8 bit blocks of local weight RAM 95. Each of the 16 local processors will be referred to as a numbered "Groupnode" as shown in FIG. 10. These Groupnodes will calculate the sum of products of 16 nodes in parallel for all nodes in each layer. A MAC chip, such as the IDT 7210 (Reference Integrated Device Technology High Performance CMOS Data Book 1988, Santa Clara Calif.), is used to provide the necessary high speed multiplication followed by the appropriate addition. A Squashing LUT RAM 96 is used to take the resultant sum of products and perform the non-linear squashing function required by many neural network algorithms.

Typically the structure of a neural network consists of a number of inputs, a number of nodes in each layer, a number of layers, and an appropriate custom non-linear squashing function. The number of inputs is written to and stored in the Input register 138. This board can be programmed to have one to 256 inputs, inclusive. The number of nodes per layer is 16 times the value stored in the Node Registers 140. This board can be programmed to have anywhere between and including one to 256 nodes per layer with a maximum of four layers. The number of nodes in each layer is stored in the respective node layer register, NL1, NL2, NL3, NL4 as shown in FIG. 10. The number of layers is stored in the Layer Register 142. The weight values of the neural network are stored in the Weight RAM blocks 95. The non-linear squashing function is stored in the Squashing LUT RAM 96. The Inputs of the neural network, as well as the intermediate layer results are stored in the Dual Ported Input RAM 90. The inputs to the neural network are stored in the even bank of the Dual Ported Input RAM. The final output of the feed forward calculation is also stored in the input RAM. The board only has to have the weights, squashing LUT, and various registers loaded once. The input RAM has to be loaded each time another unique calculation is desired.

Inputs, Weights, and Squashing Function are all in 16 Bit Signed Integer Format

This board was designed to perform integer math rather than floating point math. Integer math operations result in a simpler, smaller, faster, and lower cost board design since integer math components such as multiplier accumulator chips are significantly cheaper in integer form than in floating point form. Since available space on a PC based peripheral board is quite limited to begin with, utilizing integer math made creating this design possible for the PC.

All inputs, weights, and squashing functions must therefore be integer values before being loaded into this board. However, the values for the weights, inputs, and squashing functions are inherently floating point. If one uses the basic back propagation training mathematics as described by McClelland and Rumelhart in the book Parallel Distributed Processing one will end up with weight values that are typically floating point. Typical values range anywhere from large numbers with fractional components to very small numbers much less than one yet larger than zero. (The values can also be negative.) If one uses the Neuralware training package one will end up with floating point values as well. Since the board is designed to use integer values, the floating point values must be modified to integer format. One way to do this is take the floating point values and multiply them by sufficiently large integer values, hence scaling and shifting the floating point portion that is to the right of the decimal point to the left of the decimal point. Then use only the integer portion left of the decimal point during the feed forward calculations. The integer scaling method is illustrated below:

Converting all the inputs, weights, and squashing functions to integer format is straight forward.

The basic feed forward neural network equation, as discussed above is:

$$Y = f(\Sigma W_i X_i) \tag{1}$$

where Wi and Xi are floating point values.

To convert to integer values we perform the following steps:
If both sides of this equation are multiplied by a large integer value: $M_Y$, then you would have the following equation which is mathematically identical to equation 1.

$$M_Y Y = M_Y f(\Sigma W_i X_i), \tag{2}$$

where $M_Y$ is the output integer multiplier.
Then multiply the summation by $(M_W M_X / M_W M_X)$ which is the same as multiplying by one:

$$M_Y Y = M_Y f((M_W M_X / M_W M_X)\Sigma W_i X_i) = M_Y f((\Sigma M_W W_i M_X X_i)/M_W M_X) \tag{3}$$

where $M_W$ and $M_X$ are the weight (W) and input(X) integer multipliers respectively.
If you now take the result of equation 3 and break it down, you get:

$$M_Y Y = M_Y f(\alpha / M_W M_X) \tag{4a}$$

$$\alpha = \Sigma(M_W W_i)(M_X X_i) \tag{4b}$$

$$\beta = M_Y f(\alpha / M_W M_X) \tag{4c}$$

$$Y = \beta / MY \tag{4d}$$

Further breakdown and simplification reveals:

$$\alpha = \Sigma(W_{Mi})(X_{Mi}) \tag{5a}$$

$$W_{Mi} = M_W W_i \tag{5b}$$

$$X_{Mi} = M_X X_i \tag{5c}$$

$$\beta = M_Y f(\alpha / M_W M_X) \tag{5d}$$

$$Y = \beta / M_Y \tag{5e}$$

The last step is to remove or truncate the portion of the value that is to the right of the decimal point (i.e. eliminate the fractional component.) A standard truncation function, TRUNC, can be used to do this.

int Trunc(float Num)

Trunc returns the greatest integer less than or equal to Num, if Num>=0, or the smallest integer greater than or equal to Num, if Num<0. Num is of the type float, and the result is of the type int.

Implementing Trunc on equations 5b through 5d results in the following:

$$W_{Mti} = \text{Trunc}(W_{mi}) \tag{6a}$$

Weight Integerization $$X_{Mti} = \text{Trunc}(M_X X_i) \tag{6b}$$

Input Integerization $$\beta_t = \text{Trunc}(M_Y f(\alpha / M_W M_X)) \tag{6c}$$

Squashing Function Integerization $$Y_t = \beta_t / M_Y \tag{6d}$$

Output Deintegerization

These four equations are the core equations used for integerization. Before loading the weight values into the weight RAM use equation 6a to convert it to the appropriate integer value, likewise use equation 6b for the inputs. The value of the weight mask and the input mask have to be determined empirically for the particular application. The values for this project (determined empirically) are:

$M_W = 16384$, $M_X = 1024$, and $M_Y = 1024$.

The squashing function is implemented as a look-up-table (LUT), as discussed below. The look-up-table is loaded with values using equation 6c. Since the squashing function LUT on this board is a 16 bit RAM, one merely uses equation 6c with $\alpha$ as the address (input) to the LUT and $\beta_t$ as the data (output). Where $\alpha$ ranges, as input addresses, from −32768 to 32767. The resulting values from equation 6c are stored as data in the squashing LUT.

When using the board the final output values will be in the form of integer values. These values must be decoded, in software, using equation 6d. The result will be a floating point value.

Significant trial and error experimentation has determined that when the above method is implemented with 16 bit weights, and inputs the amount of error introduced as a result of this process is negligible.

Board Registers

The neural network accelerator board has several registers (latches) that control the loading of weight values, squashing LUT table, and network architecture these registers include:

Input Register 138

Layer 1 Node Register NL1
Layer 2 Input Register 160
Layer 2 Node Register NL2
Layer 3 Input Register 162
Layer 3 Node Register NL3
Layer 4 Input Register 164
Layer 4 Node Register NL4
Layer Register 142
Weight Page Selector Register 166
Squashing LUT Register 168
Master Control Register 144
Trigger Control Register 170

The Input Register 138 (base I/O+8) sets up the number of inputs to the network (inputs in layer 1). The first input begins with 0. Therefore, if you have ten inputs you enter 9 in this register. Likewise if you have 100 inputs then you enter 99 in this register.

The Layer 1 Node Register NL1 (base I/O+7) sets up the number of nodes per groupnode for layer 1.

Enter the number of nodes in layer one (rounded up to the nearest integer multiple of 16) divided by 16 and then subtract one. For example: if you have 32 nodes in layer one then you would enter 1. If you have 63 nodes in layer one then you would enter 3.

The Layer 2 Input Register 160 (base I/O+10 Hex) sets up the number of inputs to layer 2. The first input begins with 0. Therefore, if you have ten inputs you enter 9 in this register. Likewise if you have 100 inputs then you enter 99 in this register.

The Layer 2 Node Register NL2 (base I/O+11 Hex) sets up the number of nodes per groupnode for layer 2. Enter the number of nodes in layer two (rounded up to the nearest integer multiple of 16) divided by 16 minus one. For example: if you have 32 nodes in layer two then you would enter 1. If you have 63 nodes in layer two then you would enter 3.

The Layer 3 Input Register 163 (base I/O+12 Hex) sets up the number of inputs to layer 3. The first input begins with 0. Therefore, if you have ten inputs you enter 9 in this register. Likewise if you have 100 inputs then you enter 99 in this register.

The Layer 3 Node Register NL3 (base I/O+13 Hex) sets up the number of nodes per groupnode for layer 3. Enter the number of nodes in layer three (rounded up to the nearest integer multiple of 16) divided by 16 minus one. For example: if you have 32 nodes in layer three then you would enter 1. If you have 63 nodes in layer three then you would enter 3.

The Layer 4 Input Register 164 (base I/O+14 Hex) sets up the number of inputs to layer 4. The first input begins with 0. Therefore, if you have ten inputs you enter 9 in this register. Likewise if you have 100 inputs then you enter 99 in this register.

The Layer 4 Node Register NL4 (base I/O+2) sets up the number of nodes per groupnode for layer 4. Enter the number of nodes in layer four (rounded up to the nearest integer multiple of 16) divided by 16 minus one. For example: if you have 32 nodes in layer four then you would enter 1. If you have 63 nodes in layer four then you would enter 3.

The Layer Register 142 (base I/O+9) sets up the number of layers in the neural network. The first layer is designated as 0, the second as 1, the third as 2, etc.

The Weight Page Selector Register 166 (base I/O+4) is used to choose the local 32K weight RAM block for loading. When loading the weight values this register determines which of the groupnodes the values are being loaded to.

The Squashing LUT Register 168 (base I/O+3) is used to choose the low or high byte squashing LUT RAM 64K block.

The Master Control Register 144 (base I/O) is used to load all the board counters from the various registers.

Trigger Control register 170 (base I/O+5) is used to initiate a neural network board calculation. The board must be preloaded with inputs, weights, squashing LUT, and appropriate input, layer node counts and layer count.

Input RAM Organization

Figure 11A:
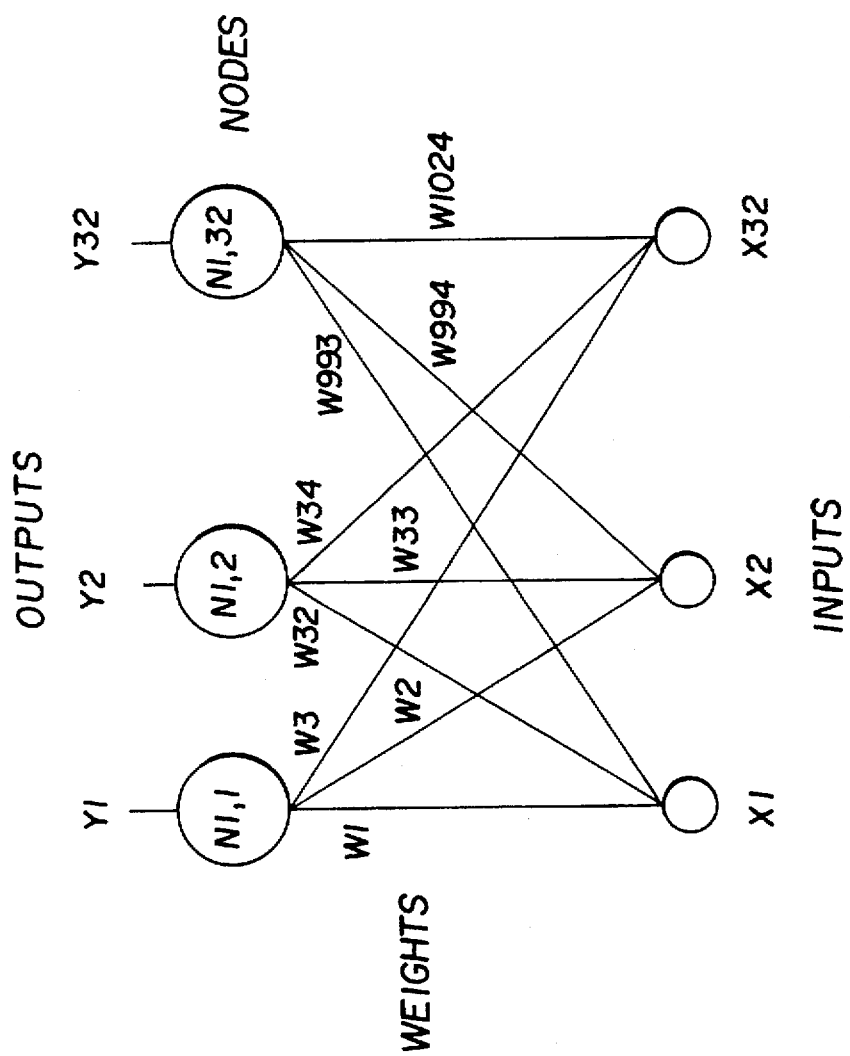
FIG. 11A is a simplified schematic depiction of a network with 32 Inputs (X), 32 Nodes (N), and 1024 Weights (W)

The input values are stored in the Input RAM 90 in a linear fashion (i.e. referring to FIG. 11A, the first input $X_1$ is stored in the least significant address of the Input RAM, $X_2$ is stored in the next least significant address, etc.)

Any input bias values are also stored in the Input RAM. FIG. 10 shows the Dual Ported Input RAM with two address and data ports. The Dual Port design is used primarily for simultaneous access to the input RAM by the Groupnodes for both input retrieval and Groupnode output storage. The input RAM is divided into two sections: an even bank and an odd bank. The even bank consists of the first 256 address locations (0 . . . 255). The odd bank consist of the next 256 address locations (256 . . . 511).

While inputs are being read from one bank of RAM, outputs of the layer currently being calculated are written into the other bank of RAM. An Even/Odd Bank Control flip flop circuit 150, such as a D-flip flop, is used to control which bank is used as the input by the Groupnodes. The input RAM is loaded using equation 6b as discussed above.

The 16 bit Input RAM is decoded as two 8 bit bytes, a low byte and a high byte. The high byte section begins at the board base memory address plus 3000 Hex, and the low byte is decoded at the board base memory address plus 2000 hex.

Weight RAM Organization

Weight values are stored in the local weight RAM blocks 95 associated with each Groupnode. Each local weight RAM block is decoded to a specific memory address block using standard computer interface logic.

Each local weight RAM is 32K words (16 bits) in size. As shown in Table 11A (which correlates to FIG. 11A), each Groupnode Weight RAM block contains only those weight values for the specific nodes that the Groupnode is responsible for. For example: In the first layer as shown in FIG. 11A, Groupnode 1 is responsible for the first node ($N_{1,1}$) while Groupnode 2 is responsible for the second node ($N_{1,2}$), . . . and Groupnode 16 is responsible for the sixteenth node ($N_{1,16}$). (The first subscript digit represents the layer number. Remaining subscript digits represent node numbers within the given layer.) If there are more than 16 nodes then the responsibility wraps back to the first groupnode and this responsibility distribution pattern repeats itself. In the case of more than 16 nodes, say 32 nodes, Groupnode 1 would now be responsible for the first ($N_{1,1}$) and the seventeenth node ($N_{1,17}$), Groupnode 2 would be responsible for ($N_{1,2}$) and ($N_{1,18}$) and so fourth. This responsibility is determined on a layer by layer basis.

Another way of describing this distribution of nodes within Groupnodes is to use the modulus or remainder operator: The assigned Groupnode number for any given node will be the remainder of the node number divided by 16. For example: node 1 divided by 16 would leave a remainder of 1. Therefore the responsibility for node 1 calculations would fall to Groupnode 1. Node 18 divided by 16 would leave a remainder of 2. Therefore the responsibility for node 18 calculations would fall to Groupnode 2. Table 11A shows the distribution of nodes and weights within the first two Groupnodes.

The node weight values are stored in each GroupNode weight RAM block in the chronological order of the layer number, node number and weight number starting with the lowest number node, weight and layer as the first address. The distribution of the weight values for each node within a Groupnode weight block is stored in a simple linear fashion. Each node always has 256 weight RAM locations reserved for it regardless of whether or not all 256 are used. As a result a node cannot have more than 256 weights or inputs. Therefore each node within a groupnode is offset by 256 weight address from the previous node. The weight value associated with the first node's first input is stored in the weight block's lowest weight address space, the weight value associated with the node's second input is stored in the next lowest weight address space and so fourth. The weights associated with subsequent nodes follow starting with the next highest node number. Each groupnode always has weight RAM locations for 16 nodes reserved for it, per layer, regardless of whether or not all 16 are used. As a result a groupnode cannot have more than 16 nodes per layer and since there are 16 groupnodes the board cannot have more than 256 nodes per layer (16 (nodes/layer)/groupnode×16 groupnodes=256 nodes/layer). Since each groupnode has space for 16 nodes and each node has space for 256 weights each groupnode has 4096 weights reserved for each layer (16 (nodes/layer)/groupnode×256 weights/node=4096 (weights/layer)/groupnode). Therefore each layer within a groupnode is offset by 4096 weight address from the previous layer regardless of whether the layer is less than or equal to the maximum. Since this board can have at most 8 layers the most RAM required per groupnode is 32K (8 layers×4096 (weights/layer)/groupnode=32K weights/groupnode). Therefore each weight RAM, as discussed above, is 32K. Since there are 16 groupnodes on the board, the board cannot have more than 64K of weight space per layer (16 groupnodes×4096 (weighs/layer)/groupnode=64K weights/layer). Since there are 16 groupnodes, each with their own 32K of local weight RAM, the board has a total of 512K of weight RAM.

The weight values for subsequent layers are stored in the same format as the first layer except the weight values for subsequent layers are placed in addresses immediately following the previous layer.

To Summarize:

Nodes: 1–256 inputs, 1–256 weights, 256–16 bit weight values are always reserved in local weight RAM Layers: 1–256 nodes (in 16 groupnodes), 1–65536 weights in 256 nodes always reserved Network: 1–8 layers with only four layers unique, with a total of 512K of weights Although the board is designed to be used with fully interconnected networks, any sparsely interconnected network can be implemented on the board. Missing connections can be implemented by setting the corresponding board weight values to zero. Missing nodes or layers that do not have an integer multiple of 16 nodes per layer will have the remaining unneeded node weights set to zero. Even though the node calculation will take place, the result associated with a missing weight or node will be zero and it will have no effect on the outcome of the calculation. The node bias weight values, if any, can be treated like any other weight values. The weight RAMs are loaded using equation 6a as discussed above.

To further illustrate the organization of the weights and nodes within the weight RAM the following examples are offered: For the case of a simple one layer network, as shown in FIG. 11A, the weights are distributed as follows:

TABLE 11A

Layer Counter Register: 0
    (3 Layers = 2, 2 Layers = 1, 1 Layer = 0, always one less than the number of layers)
Layer 1 Node Counter Register: 1
    (Always one less than the number of nodes in the layer divided by 16)
Layer 2 Node Counter Register: 0
Layer 3 Node Counter Register: 0
Layer 4 Node Counter Register: 0
Input Counter Register: 31 (Always one less than the number of inputs)

| | | |
|---|---|---|
| Groupnode 1 | | Groupnode 1, 32K Weight RAM Block |
| | | Valid Address Offset Range (from the Board's Base Address in the computer system): 0–32K |
| Layer 1 Node 1 ($N_{1,1}$) | Weight 1 ($W_1$) | Weight RAM Address Offset 0 |
| Layer 1 Node 1 ($N_{1,1}$) | Weight 2 ($W_2$) | Weight RAM Address Offset 1 |
| * | * | * |
| * | * | * |
| * | * | * |
| Layer 1 Node 1 ($N_{1,1}$) | Weight 32 ($W_{32}$) | Weight RAM Address Offset 32 |
| Layer 1 Node 17 ($N_{1,17}$) | Weight 513 ($W_{513}$) | Weight RAM Address Offset 256 |
| Layer 1 Node 17 ($N_{1,17}$) | Weight 514 ($W_{514}$) | Weight RAM Address Offset 257 |
| * | * | * |
| * | * | * |
| * | * | * |
| Layer 1 Node 17 ($N_{1,17}$) | Weight 544 ($W_{544}$) | Weight RAM Address Offset 287 |
| | | The remaining RAM values in this Weight RAM Block are set to zero |
| Groupnode 2 | | Groupnode 2, 32K Weight RAM Block |
| | | Valid Address Offset Range: 32K–64K |
| Layer 1 Node 2 ($N_{1,2}$) | Weight 33 ($W_{33}$) | Weight RAM Address Offset 32768 |
| Layer 1 Node 2 ($N_{1,2}$) | Weight 34 ($W_{34}$) | Weight RAM Address Offset 32769 |
| * | | * |

TABLE 11A-continued

| | | |
|---|---|---|
| * | * | |
| * | * | |
| Layer 1 Node 2 ($N_{1,2}$) | Weight 64 ($W_{64}$) | Weight RAM Address Offset 32799 |
| Layer 1 Node 18 ($N_{1,18}$) | Weight 544 ($W_{544}$) | Weight RAM Address Offset 33024 |
| Layer 1 Node 18 ($N_{1,18}$) | Weight 545 ($W_{545}$) | Weight RAM Address Offset 33025 |
| * | | * |
| * | | * |
| * | | * |
| Layer 1 Node 18 ($N_{1,18}$) | Weight 576 ($W_{576}$) | Weight RAM Address Offset 33055 The remaining RAM values in this Weight RAM Block are set to zero |
| Groupnode 16 | | Groupnode 16, 32K Weight RAM Block Valid Address Offset Range: 480K–512K |
| Layer 1 Node 16 ($N_{1,16}$) | Weight 481 ($W_{481}$) | Weight RAM Address Offset 491520 |
| Layer 1 Node 16 ($N_{1,16}$) | Weight 482 ($W_{481}$) | Weight RAM Address Offset 491521 |
| * | * | * |
| * | * | * |
| * | * | * |
| Layer 1 Node 16 ($N_{1,16}$) | Weight 64 ($W_{512}$) | Weight RAM Address Offset 491551 |
| Layer 1 Node 32 ($N_{1,32}$) | Weight 992 ($W_{992}$) | Weight RAM Address Offset 491776 |
| Layer 1 Node 32 ($N_{1,32}$) | Weight 993 ($W_{993}$) | Weight RAM Address Offset 491777 |
| * | * | * |
| * | * | * |
| * | * | * |
| Layer 1 Node 32 ($N_{1,32}$) | Weight 1024 ($W_{1024}$) | Weight RAM Address Offset 491807 The remaining RAM values in this Weight RAM Block are set to zero |

Figure 11B:
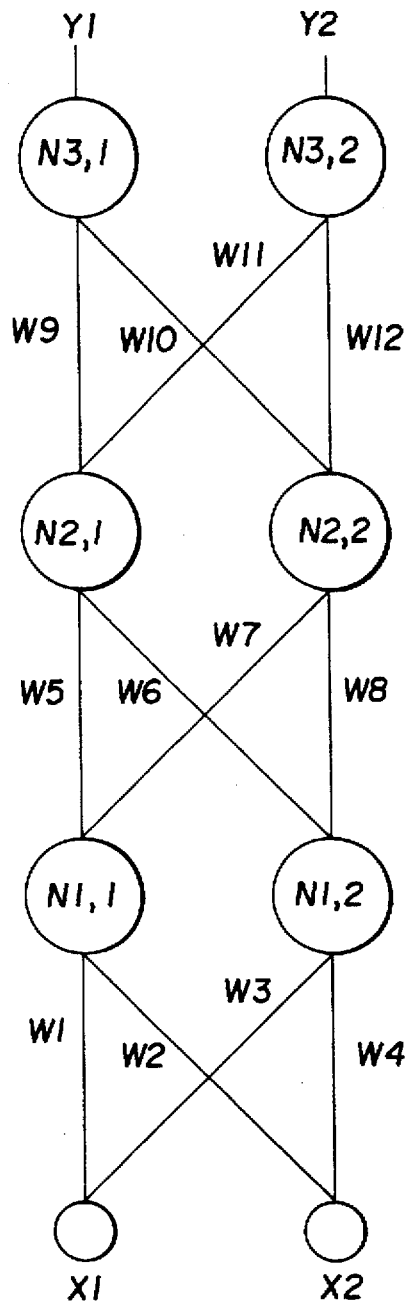
FIG. 11B depicts a three layer neural network with 2 Inputs (X) 16 nodes (N), and 12 Weights (W)

For the case of a simple three layer network, as shown in FIG. 11B, the weights are distributed as follows:

TABLE 11B

Layer Counter Register: 2
(Layer 3 = 2, Layer 2 = 1, Layer 1 = 0, always one less than the number of layers)
Layer 1 Node Counter Register: 0
(Always one less than the number of nodes in the layer divided by 16)
Layer 2 Node Counter Register: 0
Layer 3 Node Counter Register: 0
Layer 4 Node Counter Register: 0
Input Counter Register: 1 (Always one less than the number of inputs)

| | | |
|---|---|---|
| Groupnode 1 | | Groupnode 1, 32K Weight RAM Block Valid Address Offset Range: 0–32K |
| Layer 1 Node 1 ($N_{1,1}$) | Weight 1 ($W_1$) | Weight RAM Address Offset 0 |
| Layer 1 Node 1 ($N_{1,1}$) | Weight 2 ($W_2$) | Weight RAM Address Offset 1 |
| Layer 2 Node 1 ($N_{2,1}$) | Weight 5 ($W_5$) | Weight RAM Address Offset 4096 |
| Layer 2 Node 1 ($N_{2,1}$) | Weight 6 ($W_6$) | Weight RAM Address Offset 4097 |
| Layer 3 Node 1 ($N_{3,1}$) | Weight 9 ($W_9$) | Weight RAM Address Offset 8192 |
| Layer 3 Node 1 ($N_{3,1}$) | Weight 10 ($W_{10}$) | Weight RAM Address Offset 8193 The remaining RAM values in this Weight RAM Block are set to zero |
| Groupnode 2 | | Groupnode 2, 32K Weight RAM Block Valid Address Offset Range: 32K–64K |
| Layer 1 Node 2 ($N_{1,2}$) | Weight 3 ($W_3$) | Weight RAM Address Offset 32768 |
| Layer 1 Node 2 ($N_{1,2}$) | Weight 4 ($W_4$) | Weight RAM Address Offset 32769 |
| Layer 2 Node 2 ($N_{2,2}$) | Weight 7 ($W_7$) | Weight RAM Address Offset 36864 |
| Layer 2 Node 2 ($N_{2,2}$) | Weight 8 ($W_8$) | Weight RAM Address Offset 36865 |
| Layer 3 Node 2 ($N_{3,2}$) | Weight 11 ($W_{11}$) | Weight RAM Address Offset 40960 |
| Layer 3 Node 2 ($N_{3,2}$) | Weight 12 ($W_{12}$) | Weight RAM Address Offset 40961 The remaining RAM values in this Weight RAM Block are set to zero |

Groupnode 3 through 16
All remaining weight Values are set to zero

Figure 11C:
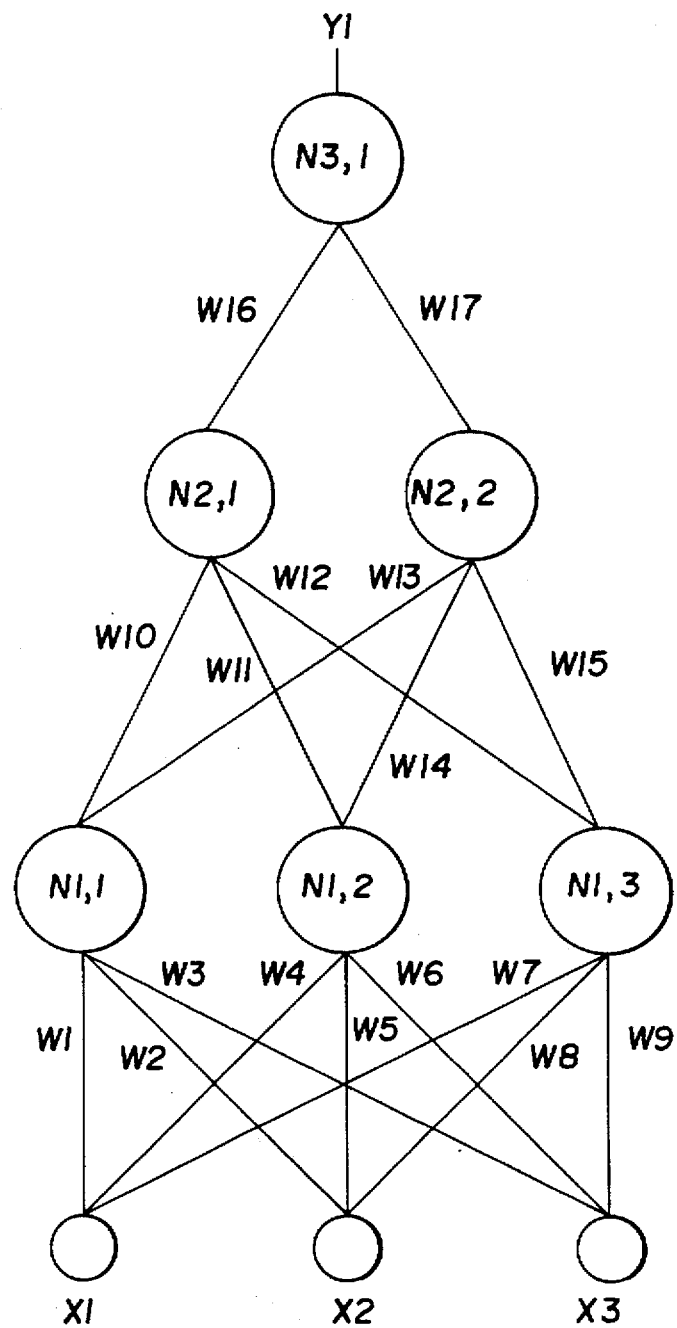
FIG. 11C depicts a three layer neural network with 3 Inputs (X), 6 Nodes (N) and 17 Weights (W)

For the case of a three layer network, as shown in FIG. 11C, the weights are distributed as follows:

TABLE 11C

Layer Counter Register: 2
(Layer 3 = 2, Layer 2 = 1, Layer 1 = 0, always one less than the number of layers)
Layer 1 Node Counter Register: 0
(Always one less than the number of nodes in the layer divided by 16)
Layer 2 Node Counter Register: 0
Layer 3 Node Counter Register: 0
Layer 4 Node Counter Register: 0
Input Counter Register: 2 (Always one less than the number of inputs)

Groupnode 1                                             Groupnode 1, 32K Weight RAM Block
                                                        Valid Address Offset Range: 0–32K Layer 1  Node 1 ($N_{1,1}$)   Weight 1 ($W_1$)          Weight RAM Address Offset 0
Layer 1  Node 1 ($N_{1,1}$)   Weight 2 ($W_2$)          Weight RAM Address Offset 1
Layer 1  Node 1 ($N_{1,1}$)   Weight 3 ($W_3$)          Weight RAM Address Offset 2

Layer 2  Node 1 ($N_{2,1}$)   Weight 10 ($W_{10}$)      Weight RAM Address Offset 4096
Layer 2  Node 1 ($N_{2,1}$)   Weight 11 ($W_{11}$)      Weight RAM Address Offset 4097
Layer 2  Node 1 ($N_{2,1}$)   Weight 12 ($W_{12}$)      Weight RAM Address Offset 4098

Layer 3  Node 1 ($N_{3,1}$)   Weight 16 ($W_{16}$)      Weight RAM Address Offset 8192
Layer 3  Node 1 ($N_{3,1}$)   Weight 17 ($W_{17}$)      Weight RAM Address Offset 8193
                                                        The remaining RAM values in this Weight RAM Block
                                                        are set to zero Groupnode 2                                             Groupnode 2, 32K Weight RAM Block
                                                        Valid Address Offset Range: 32K–64K Layer 1  Node 2 ($N_{1,2}$)   Weight 4 ($W_4$)          Weight RAM Address Offset 32768
Layer 1  Node 2 ($N_{1,2}$)   Weight 5 ($W_5$)          Weight RAM Address Offset 32769
Layer 1  Node 2 ($N_{1,2}$)   Weight 6 ($W_6$)          Weight RAM Address Offset 32770

Figure 11D:
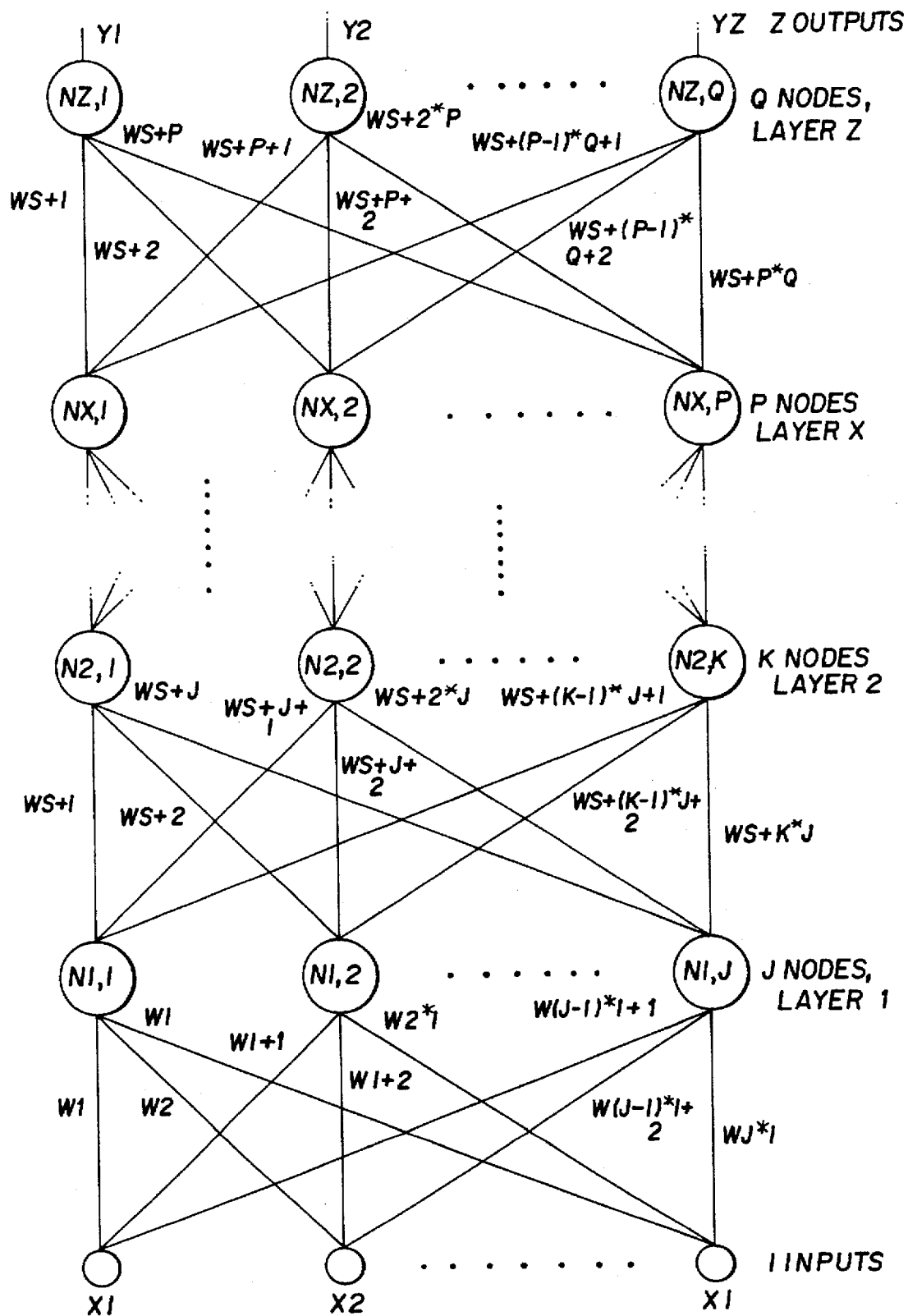
FIG. 11D is a simplified schematic representation of a general multilayer neural network.

Layer 2  Node 2 ($N_{2,2}$)   Weight 13 ($W_{13}$)      Weight RAM Address Offset 36864
Layer 2  Node 2 ($N_{2,2}$)   Weight 14 ($W_{14}$)      Weight RAM Address Offset 36865
                                                        The remaining RAM values in this Weight RAM Block
                                                        are set to zero Groupnode 3                                             Groupnode 3, 32K Weight RAM Block
                                                        Valid Address Offset Range: 64K–96K Layer 1  Node 3 ($N_{1,3}$)   Weight 7 ($W_7$)          Weight RAM Address Offset 65536
Layer 1  Node 3 ($N_{1,3}$)   Weight 8 ($W_8$)          Weight RAM Address Offset 65537
Layer 1  Node 3 ($N_{1,3}$)   Weight 9 ($W_9$)          Weight RAM Address Offset 65538
                                                        The remaining RAM values in this Weight RAM Block
                                                        are set to zero Groupnode 4 through 16
All remaining weight Values are set to zero
For the general case of a multilayer network, as shown in FIG. 11D, the weights are distributed as
follows:
(Only Groupnode 1 is shown in order to illustrate the organization of the weights. The remaining
weights in remaining groupnodes are distributed in the order previously described.)

Groupnode 1                                             Groupnode 1, 32K Weight RAM Block
                                                        Valid Address Offset Range: 0–32K Layer 1  Node 1 ($N_{1,1}$)   Weight 1 ($W_1$)          Weight RAM Address Offset 0
Layer 1  Node 1 ($N_{1,1}$)   Weight 2 ($W_2$)          Weight RAM Address Offset 1
Layer 1  Node 1 ($N_{1,1}$)   Weight 3 ($W_2$)          Weight RAM Address Offset 2
         *                                                       *
         *                                                       *
         *                                                       *
Layer 1  Node 1 ($N_{1,1}$)   Weight I ($W_I$)          Weight RAM Address Offset I − 1 (I = Number if Inputs)

Layer 2  Node 1 ($N_{2,1}$)   Weight S + 1 ($W_{S+1}$)  Weight RAM Address Offset 4096
Note: (S = I*J)
Layer 2  Node 1 ($N_{2,1}$)   Weight S + 2 ($W_{S+1}$)  Weight RAM Address Offset 4097
Layer 2  Node 1 ($N_{2,1}$)   Weight S + 3 ($W_{S+2}$)  Weight RAM Address Offset 4098
         *                                                       *
         *                                                       *
         *                                                       *
Layer 2  Node 1 ($N_{2,1}$)   Weight S + J ($W_{S+J}$)  Weight RAM Address Offset 4096 + J
Note: J = number of inputs to the second layer
Layer 3  Node 1 ($N_{3,1}$)   Weight S + 1 ($W_{S+1}$)  Weight RAM Address Offset 8192
Note: (S = I*J + J*K)
Layer 3  Node 1 ($N_{3,1}$)   Weight S + 2 ($W_{S+1}$)  Weight RAM Address Offset 8193
Layer 3  Node 1 ($N_{3,1}$)   Weight S + 3 ($W_{S+2}$)  Weight RAM Address Offset 8194
         *                                                       *
         *                                                       *
         *                                                       *
Layer 3  Node 1 ($N_{3,1}$)   Weight S + J ($W_{S+J}$)  Weight RAM Address Offset 8192 + K
Note: K = number of inputs to the third layer
         *                                                       *
         *                                                       *
         *                                                       *
Note: (S = I*J + J*K + . . . + P*Q)
Layer Q  Node 1 ($N_{Q,1}$)   Weight S + 1 ($W_{S+1}$)  Weight RAM Address Offset Q*4096
Layer Q  Node 1 ($N_{Q,1}$)   Weight S + 2 ($W_{S+2}$)  Weight RAM Address Offset (Q*4096) + 1

TABLE 11C-continued

| | |
|---|---|
| * | * |
| * | * |
| * | * |
| Layer Q Node 1 ($N_{Q,1}$)   Weight S + P ($W_{S+2}$) | Weight RAM Address Offset (Q*4096) + P |
| | The remaining RAM values in this Weight RAM Block are set to zero |

The number of nodes in each layer's node register must be set to the number appropriate for the given layer. However, since there are only four layer registers only the first four layers can be uniquely specified. The last four layers, if used, will equal the size of the first four layers respectively. The number of nodes and inputs in Layer 5 will equal the number of nodes and inputs in layer 1. The number of nodes and inputs in Layer 6 will equal the number of nodes and inputs in layer 2. The number of nodes and inputs in Layer 7 will equal the number of nodes and inputs in layer 3. The number of nodes and inputs in Layer 8 will equal the number of nodes and inputs in layer 4.

Unneeded nodes can have their weight values set to zero, thus causing these unneeded nodes to have no effect on the calculation. This effectively allows users to tailor each layer to the required number of nodes needed for each layer.

The 16 bit local weight RAMs are decoded as two 8 bit bytes, a low byte and a high byte. Since the lower one megabyte of RAM space on the PC is very limited, the 512K of weight RAM is decoded using an I/O controlled 32K memory paging technique. The weight memory page window begins at the board base memory address plus 7000 Hex and is 32K in length. The desired page is selected using the page selector register 166. The desired weight RAM block is first selected (see table below) with the Page Selector and then the appropriate weights are downloaded to the weight RAM.

| Page Selector | Weight Ram |
|---|---|
| 0 | Groupnode 0, Low Byte |
| 1 | Groupnode 0, High Byte |
| 2 | Groupnode 1, Low Byte |
| 3 | Groupnode 1, High Byte |
| 4 | Groupnode 2, Low Byte |
| 5 | Groupnode 2, High Byte |
| 6 | Groupnode 3, Low Byte |
| 7 | Groupnode 3, High Byte |
| 8 | Groupnode 4, Low Byte |
| 9 | Groupnode 4, High Byte |
| 10 | Groupnode 5, Low Byte |
| 11 | Groupnode 5, High Byte |
| 12 | Groupnode 6, Low Byte |
| 13 | Groupnode 6, High Byte |
| 14 | Groupnode 7, Low Byte |
| 15 | Groupnode 7, High Byte |
| 16 | Groupnode 8, Low Byte |
| 17 | Groupnode 8, High Byte |
| 18 | Groupnode 9, Low Byte |
| 19 | Groupnode 9, High Byte |
| 20 | Groupnode 10, Low Byte |
| 21 | Groupnode 10, High Byte |
| 22 | Groupnode 11, Low Byte |
| 23 | Groupnode 11, High Byte |
| 24 | Groupnode 12, Low Byte |
| 25 | Groupnode 12, High Byte |
| 26 | Groupnode 13, Low Byte |
| 27 | Groupnode 13, High Byte |
| 28 | Groupnode 14, Low Byte |
| 29 | Groupnode 14, High Byte |
| 30 | Groupnode 15, Low Byte |
| 31 | Groupnode 15, High Byte |

Squashing LUT RAM Organization

The Squashing LUT RAM 96 is a simple look up table that allows the implementation of custom squashing function equations. A typical squashing function such as $Y=1/(1+e^{-x})$, or hyperbolic tangent, $\tanh(x)$ would be stored in the Squashing LUT with X implemented as the LUT RAM address lines and Y implemented as the LUT RAM data lines. These values are memory mapped into the LUT prior to utilizing the board for feed forward calculations. The Squashing LUT RAM is loaded using equation 6c as discussed above.

The 16 bit Squashing LUT RAM is decoded as two 8 bit bytes, a low byte and a high byte. Since the lower one megabyte of RAM space on the PC is very limited, the LUT RAM is decoded using an I/O controlled 64K memory paging technique. The LUT memory page windows begins at the board base memory address and is 64K in length. The desired page is selected using the squashing LUT page selector I/O port located at the board base I/O address plus three. The desired squashing LUT RAM block is first selected (see table below) with the Page Selector and then the appropriate weights are downloaded to the LUT RAM. When you are not loading the LUT RAM you must set the LUT Page Selector to FF hex.

| LUT Page Selector | LUT Ram |
|---|---|
| FF | Turn off the PC Bus access to the LUT RAM |
| FE | Low Byte (Turns on access via PC bus) |
| FD | High Byte (Turns on access via PC bus) |

A software program for loading various registers and weights into the neural network accelerator board is presented in Appendix A.

Neural Network Feed Forward Calculation

With the neural network board preloaded with the appropriate inputs, weights, squashing function, and other network parameters a trigger signal is sent to the Master Clock 152 by writing an I/O bit to the Trigger Control Register 170 (positive pulse on bit 0). As shown in FIG. 10 this trigger signal will enable the Master Clock and allow the calculation to begin. The clock will begin transmitting clock signals to the various counters. The clock signals are used by the counters to generate weight and input address values from the Input Counter 154, Node Counter 156, Layer Counter 158 and Groupnode Counter 166. The initial address values in the counters are the values originally stored in the respective registers. The input address used by the Dual Ported Input RAM 90 is derived from the Input Counter 154. The Groupnode Weight RAM addresses are derived from the counters with the first 8 address bits generated by the Input Counter 154, followed by the next 4 address bits generated by the Node Counter 156, followed by the last 3 address bits generated by the Layer Counter 158. As each leading edge of the clock signal is received by the Input Counter 159 it will decrement by one. After reaching zero the next leading edge from the clock signal will cause a borrow signal to flow from the Input Counter 159 to the Node Counter 156 causing it to decrement by one. When the Node Counter 156 underflows past zero it will send a borrow signal to the Layer Counter 158 causing it to decrement by one. When the Layer Counter 158 changes in value a signal is sent to the Layer Decoder 162, along with the layer number, causing the Layer Decoder to select the appropriate layer node and layer input register with which to preset the counters for the next layer calculation. When each counter reaches zero it will automatically reset to the values stored in the registers. The Input, Node, and Layer addresses are used to address the Input Data and Weight Data values associated with the appropriate nodes and layers, as shown in FIGS. 11A–11D and Tables 11A–11D. The respective weight values are multiplied by the respective input values by the MAC once on each clock cycle. The product is then summed in an internal register (not shown) that is part of the MAC circuit. When all inputs and weights for a given node are multiplied and summed the result in the internal register is then presented to the input of the Squashing LUT RAM 96. The output of the Squashing LUT RAM is the output of a node for a given layer. The Squashing LUT RAM 96 is multiplexed across each Groupnode by enabling the Groupnode outputs one at a time. The enabling control is performed by the Groupnode Counter 160 and 4 to 16 Decoder 161 as shown in FIG. 10.

The results from the first layer are stored back into the Dual Ported RAM in the odd bank. The results from the second layer, if any, are stored in the even bank thus overwriting the previous values and so on and so forth. Upon completion of a neural network calculation the output results can be read from the Input Dual Port RAMs using standard software commands.

The subsequent neural network layer calculations, if any, are performed immediately after the calculation of the last node of the previous layer is complete. The subsequent layer will use the outputs of the previous layer as inputs. These inputs will be located in the appropriate bank of the Dual Ported Input RAM.

In the case of the second layer of a network the inputs will be located in the odd bank of the input RAM.

The final output will be stored in one of the banks of the Dual Ported Input RAM. The output values for any given layer will always be in the odd bank if the layer number is odd (i.e. if the last layer calculated was layer 3 then the output will be located in the odd bank). The output values will always be the even bank location if the layer number is even (i.e. if the layer calculated was layer 2 then the output will be located in the even bank).

Advantages of Using MACs

The technique of using MACs to perform the multiplication and addition of each weight in a node can provide very significant time savings over a standard microprocessor or digital signal processor. A typical MAC can perform a fetch, multiplication and addition of a weight value and input value in less than 25 nanoseconds. With 16 MACs running in parallel 16 operations can be performed in a single 25 nanosecond period. This provides a very significant reduction in computation time over virtually all Intel based AT compatible computers and related digital signal processors. A typical Intel 80386 microprocessor may take up to 75 clock cycles to retrieve, multiply, add, and store one input and weight value operation. At 50 MHz clock rates the same operation on sixteen nodes would take over 1.5 microseconds per node or a total of 24 microseconds. Dividing 24 microseconds by 25 nanoseconds reveals that 16 MACs provides almost three orders of magnitude (1000) computation time reduction.

Advantages of Using and Recycling Dual Ported RAM

This technique of storing these intermediate values to RAM also allows a considerable reduction in time to process the network calculations since minimal time is spent transferring values from the output of one network layer to the input of the next layer.

Also the technique of storing intermediate values back into the input RAM helps reduce the amount of additional hardware required for subsequent layers, since the hardware for layer one can be reused for layer two and above. This helps create a smaller circuit thus allowing the design to fit in a small package. Additionally the reduction in circuit size and components helps reduce overall board energy consumption thus allowing the board to be used in systems where power is limited, such as battery operated systems.

To summarize operation of the system, after all peripheral boards have been initialized by the operating system software, scanning begins asynchronously. The software controlled system is set up with a high speed line scan camera appropriately positioned above the edge of a moving web of material having edgemarkings to be extracted and characterized. If the material is light sensitive, transmissive infrared illumination is utilized, along with an appropriate white light filter at the camera input. The camera and infrared optics view the web at periodic intervals and digitally capture images of the numeric characters on the web. These images are stored in RAM on the frame grabber board one line scan at a time. The rate and timing of capture or scanning is controlled by an optical shaft encoder and corresponding encoder board. The optical shaft encoder is attached to a roller in the web transport system.

A high powered infrared lighting unit is used to illuminate the Estar® web. However, high powered IR LED's are notoriously unstable in their ability to deliver large amounts of infrared photons in a stable spatial and temporal fashion. This is largely due to temperature changes in the IR LED as current passes through it. If left uncooled at required power levels in an environment at room temperature the LED will easily reach 120° F. This varying light intensity over time will cause the images captured by the line scan camera to change drastically in brightness and contrast. Often the images will simply wash out if the IR LED achieves a high enough brightness. As a result, means were developed to control the intensity fluctuations of the IR LED. These include maintaining a constant current through the LED and maintaining a constant set temperature for the LED.

Two factors were primarily responsible for LED fluctuations:

1. As LED temperature changes, the LED's internal resistance changes. If a constant voltage source power supply is used to power the LED, then as LED resistance changes, the current will change. Since the light output intensity of the LED is approximately proportional to incoming current, the amount of light emitted by the LED will change with temperature if a constant voltage source is used.
2. As LED temperature changes, the LED's spatial light output pattern changes, i.e. the output angular intensity pattern of the LED shifts. This causes a problem because the bright zone of the intensity profile will often shift away from the line scan camera. Hence, a decrease in light intensity is seen by the camera.

To a large extent the replacement of the constant voltage source power supply with a constant current source power supply resolves the first-listed problem.

With the constant current source, the overall power output of the LED does not change significantly over time; however, the temperature does. As the temperature changes the spatial pattern shifts. This problem is addressed using a Thermal Electric Cooler (TEC) and TEC controller with temperature feed back. A description of the IR Lighting Unit follows.

The Infrared Light Source Unit consists of an infrared LED, lens, lens mount, aluminum heat sink, solid state Thermal Electric Cooler (TEC), thermistor, TEC power supply controller, and constant current source.

The glass lens is mounted directly above the emitting side of the IR LED in such a way that light is uniformly collimated into a parallel beam that shines through the semi-transparent Estar® material. The IR LED emits peak illumination at 940 nm. The lens mount is made of aluminum and is separated into two components. The first component rests on top of the LED housing (LED cathode), and the second (smaller) aluminum heat sink/mount is attached to the IR LED stud (anode). Glued into place at the stud, directly above and on the surface of the second smaller heat sink is a small thermistor. Thermistors are electrically resistive temperature sensing devices. The two wires of the thermistor are connected to the TEC power supply controller. The controller uses the signal from the thermistor as temperature feedback information to monitor the IR LED temperature.

A TEC element of approximately 0.5 inches by 0.5 inches by 0.085 inches is placed under and in contact with the second smaller heat sink. The TEC is a solid state cooler that uses electrical current to transfer heat from one side of the TEC to the other. This causes the side of the smaller heat sink closest to the thermistor to cool and the opposite side to heat up. Two wires from the TEC are connected to the current supply of the TEC power supply controller. The power supply controller is preprogrammed to maintain the IR LED temperature to a desired temperature, in this case 95° F.

The heating side of the TEC must have a heat sink, such as a large aluminum block, to transfer its heat to or it will overheat. Therefore, immediately below and in contact with the TEC surface is a large aluminum mounting plate.

Figure 9:
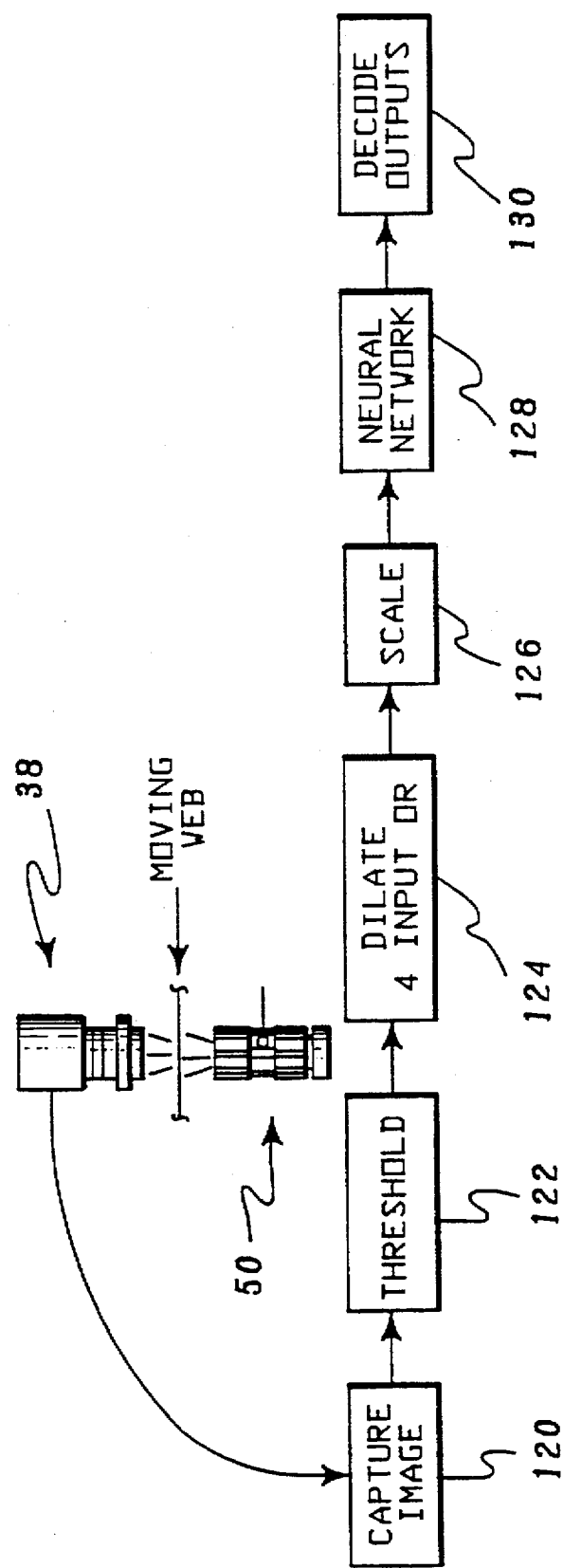
FIG. 9 depicts an operational overview of one embodiment of the main processing functions of a neural network optical character recognition system pursuant to the present invention.

Referring now to FIG. 9, after capturing an image 120 the first 32 bits of the 256–8 bit digital image pixels in the frame grabber board are transferred by software control to the preprocessing board. These 32 pixels correspond to the area of interest within the column of available pixel data. After receiving two 32 pixel columns, the preprocessing board takes this image data and performs simple image processing operations on it within several hundred nanoseconds. These operations include thresholding 122, dilation 124 and scaling 126. The dilation and scaling occur substantially simultaneously in the novel logic embodiment described.

The resulting 16 bits of pixel data are then pushed into a pipelined RAM (84 of FIG. 4). The pipelined RAM acts as a dynamic image window storage circuit where an entire 16×16 moving pixel window of an image is stored. The resultant data from the preprocessing circuit is then passed on to a two's complement converter circuit which converts the image data into its final format before transferring the information across an external bus to the neural network accelerator board. The neural network receives this data and proceeds to classify it. The classified result is sent out a communications port for processor decoding 130, for example, into a corresponding ASCII character for storage and/or display.

The optical character recognition system is designed and set up to scan the moving web in a virtually continuous fashion. For example, every 0.0085 inches of web motion will cause the system to capture a new scan line of image pixel data and to analyze the image stored in the preprocessing board's pipeline dual-port RAM. If no valid numeric-character is present, no information is sent out of the serial communication port. When a character finally falls under the camera and fills the pipelined RAM, the system will send a valid character out the communication line. In this way, a separate numeric-character registration device for each character is not required.

Those skilled in the art will recognize that the system/method presented above provides the advantages initially set forth herein. Specifically, a novel character recognition approach employing a neural network to recognize edgemarked characters on a moving web of material is described. The technique can identify highly aberrated dot-matrix numeric characters on a moving web of transparent or semi-transparent material. Further, a novel neural network accelerator board is presented, which is capable of significantly enhanced performance over any heretofore known accelerator board, in addition to improved performance over any software based character recognition implementation. Presented is a practical neural network application to the recognition of edgemarked characters on a moving web. Using the technique, characters can be properly recognized not withstanding that they may be of such poor quality as to be unrecognizable to the naked eye. The system and method described operate in real time on the generated data.

Although several embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

```
(*****************************************************************************)
(* Copyright © 1993, Eastman Kodak                                          *)
(* Created by: Ken Loewenthal                                               *)
(*                                                                          *)
(*                                                                          *)
(* Borland's Turbo Pascal for DOS Version 4.0                               *)
(*                                                                          *)
(*  Quick Example Program                                                   *)
(*                                                                          *)
(* This software program will load various registers and weights from a file created by Neuralwares' *)
(* Professional II Plus, neural network training program into the neural network board. *)
(* This program will also set up the squashing LUT Rams, and test the Input RAMs. *)
(*                                                                          *)
(*  This program must be run from a DOS prompt: C:>                         *)
(* This program will use the command line file name if present else         *)
(* a default name: NEURALNT.WGT .                                           *)
(*                                                                          *)
(* Weight File format: Weights are stored in order of lowest numbered input to highest, with the *)
(* lowest number node to the highest within a layer starting with the lowest numbered layer to the *)
(* highest numbered layer. The bias (thresh) input weight is first , followed by the remaining input *)
(* weights.                                                                 *)
(* The weights must be stored as simple ASCII text of one weight value per line followed *)
(* by a carriage return. The weight values are interlaced with junk delta values. These delta values *)
(* are read in but ignored by this program. These values can be of an value. These delta values *)
(* must be simple numeric ASCII text followed by a carriage return.         *)
(*                                                                          *)
(* Example of part of a weight file:                                        *)
(*                                                                          *)
(*   0.61704385                                                             *)
(*  1.570292e-008                                                           *)
(*  -0.43285236                                                             *)
(*  -1.570292e-008                                                          *)
(*  0.039284974                                                             *)
(*  -1.570292e-008                                                          *)
(*  -0.35508332                                                             *)
(*  -1.570292e-008                                                          *)
(*  0.2131182                                                               *)
(*  -1.570292e-008                                                          *)
(*  0.15716928                                                              *)
(*  -1.570292e-008                                                          *)
(*  0.028389046                                                             *)
(*  -1.570292e-008                                                          *)
(*  -0.13039547                                                             *)
(*  -1.570292e-008                                                          *)
(*  0.37820742                                                              *)
(*  -1.570292e-008                                                          *)
(*  -0.48221001                                                             *)
(*          .                                                               *)
(*          .                                                               *)
(*          .                                                               *)
(*                                                                          *)
(*  1.570292e-008                                                           *)
(*  -0.0067023956                                                           *)
```

```
(*                                                                              *)
(* The very first value (0.61704385) is a weight value for the bias input (thresh) *)
(* The second value (1.570292e-08) is a delta value and is ignored. In your file this can be *)
(* any number. It will always be ignored but must be present for proper read operation of this code.*)
(* The third value (-0.43285236) is a weight value, etc.                         *)
(*                                                                              *)
(*                                                                              *)
(* Abbreviations:     NN = Neural Network, HW = Hardware, SW=Software            *)
(*                    $ = HEX, i.e. $100 = 100 Hex= 256 Decimal                  *)
(*                    L1 = Layer 1, L2=Layer 2, etc.                             *)
(*                                                                              *)
(*                    Memory Models: Nonlinear 80x86 segment and offset addressing *)
(******************************************************************************)

uses
   dbgglb, (* Global variables for program are stored in ddbgglb.pas *)
   crt,    (* This UNIT contains basic CRT functions that are standard with Turbo Pascal *)
   dos,    (* This UNIT contains basic DOS functions that are standard with Turbo Pascal *)
   turbo3 ; (* This UNIT contains basic Turbo 3.0 functions that are standard with Turbo Pascal *)

const
   NN_base_mem = $A000; (* Neural Network Accelerator Board Base Mem Address *)
   NN_base_IO = $300;   (* Neural Network Accelerator Board Base I/O address*)
   rev_date = '6/10/93';
   weight_filename = 'NEURALNT.WGT'; (* Default Neural Net weight file to load *)

type
   string127 = string[127];

var
   i : integer;
   debug_filename : string127;

{$M 32000, 0, 640000 }  (* Stack and Heap Size *)

(******************************************************************************)
(* General purpose weight loading function.                                    *)
(* Load the Nth layer with the weight values in the variables: weight & thresh *)
(*                                                                             *)
(* master_control is the data value the controls the loading of counters with Input, Node, and Layer*)
(* information stored in the respective latches.                               *)
(* master_control is also used to start the neural network board calculation.  *)
(*                                                                             *)
(* layer_number: represents the layer number to load weights to.               *)
(*                                                                             *)
(* node_number: is the node number of the weights to be loaded into RAM        *)
(*                                                                             *)
(* number_of_inputs: is the number of inputs for the current node              *)
(*                                                                             *)
(* weight: is the weight array that contains the weight values read from the file. *)
(* These weight values must be stored as an array of longint.                  *)
(* This array must contain all the weights for the current node.               *)
(*                                                                             *)
(* thresh: is the thresh (bias) value read from the weight file.               *)
```

```
procedure load_layer_N_by_node( master_control,
                 layer_number,
                 node_number,
                 number_of_inputs : integer;
                 weight : layer_one_vector_type_int;
                 thresh : longint );
var
  offset : word;
  low_weight_val,
  high_weight_val : byte;
  group_node_index : word;
  layer_offset_addr : word;

begin
  (* Write SMT Board Version on CRT *)
  writeln('Lay: ',layer_number:2,' Node: ',node_number:3,' Weight[1]: ',weight[1]:8);

(* layer_number : [1,2,3,4], 16 nodes at a time in order, groupnode 0 *)
  (* has node 0, groupnode 1 has node 1, groupnode 2 has node 2, etc... *)
  group_node_index := node_number div 16;

(* Layer offset within a groupnode = 256 * 16 = 4096 = $1000 *)
  (* 256 Inputs multiplied by a maximum of 16 Nodes per groupnode is 4096 weight RAM locations *)
  (* Node offset within a layer = 256 inputs = $100 (Input Counter = 8 Bits*)
  (* The Weight RAM offset from the base memory address = $7000 this is wire on the board.*)

(* Please note the first 8 bits of the address is generated by the Input Counter, you cannot change *)
  (* this fact even if you have less than 256 inputs. If you have less than 256 inputs the remain weight *)
  (* values representing these inputs will still exist, but they will be unused. *)

(* Also note that the next four bits of the address is generated by the 4 bit Node Counter, you cannot *)
  (* change this fact even if you have less that 16 nodes per groupnode. Since there are 16 groupnodes *)
  (* (i.e. 16 MACs & weight RAM Blocks) with 256 weights per node reserved each groupnode is    *)
  (* forced to save a minimum of 256 * 16 or 4096 weights per each layer reserved for it *)
  (* regardless of whether or not they are all used. With a total of 16 groupnodes this amounts to *)
  (* 4096*16 or  65536 ($10000) weights reserved per layer. *)

layer_offset_addr := layer_number*$1000 + group_node_index*$100 + $7000;

(* --------------- HIGH BYTE SECTION ---------------------*)

(* Set up master control Register on the Neural Network Board *)
  port[NN_base_IO] := master_control;

(* Chose the correct Groupnode weight RAM block *)
  (* Choose one of the 16 weight RAM blocks to write the weight data to, start with the high byte*)
  (* High = Odd Numbered WT_CEs *)
  port[NN_base_IO + 4] := 2*(node_number mod 16) + 1; (* The 1 denotes high byte *)

(* Write the high order weight bytes to NN weight RAM *)
  for offset := 0 to (number_of_inputs - 2) do (* -2 avoids the bias *)
  begin
     high_weight_val := hi(weight[offset + 1]);
```

```
   (* weight[1..150], offset begins at 0 *)
   mem[NN_base_mem:layer_offset_addr + offset] := high_weight_val;

end;

(* Place the threshold/bias , as the last weight *)
offset := number_of_inputs - 1;
mem[NN_base_mem:layer_offset_addr + offset] := hi(thresh);

(* --------------- LOW BYTE SECTION --------------------*)

(* Set up master control *)
port[NN_base_IO] := master_control;

(* Choose one of the 16 weight RAM blocks to write the weight data to. Now the Low Byte*)
port[NN_base_IO + 4] := 2*(node_number mod 16);

(* Low order weight bytes, node 0 address *)
for offset := 0 to (number_of_inputs - 2) do
begin
    low_weight_val := lo(weight[offset + 1]);
    mem[NN_base_mem:layer_offset_addr + offset] := low_weight_val;
end;

(* Place the threshold/bias weight, as the last weight *)
offset := number_of_inputs - 1;
    mem[NN_base_mem:layer_offset_addr + offset] := lo(thresh);
end;

(****************************************************************************)

procedure test_for_out_of_bounds_error( data_value : real;
                        lay_num,
                        node_num,
                        input_num : integer );

begin (* Very IMPORTANT the absolute value has to be LESS than 2.0, it cannot    *)
(* equal 2.0 or be greater than 2.0. If it is it will cause the performance *)
(* of the neural network accelerator board to drop several percent. We had *)
(* One case where four weight values were set to 2.0 and it cause the       *)
(* performance of the NN board to drop from 99.91% to 97.5%. Finding the   *)
(* solution to this problem was difficult, a real pain in the neck.        *)
(* Note: If the performance of the board is 99.91% then a 14 digit message *)
(* will have a 98.7% chance for recognition. If the board is at 97.5% then *)
(* a 14 digit message will have a 70.2% chance for recognition (6/9/93).   *)

if ( ( data_value > 1.9999 ) or ( data_value < -1.9999 ) ) then
   begin
      gotoxy(1,24);
      writeln(' ERROR! Large Absolute Value ( > |1.9999| ), HW Requires Weight Values < |2| ');
      writeln(' LOCATION: Layer#:',lay_num:3,' Node#: ',node_num:3,'Input#: ', input_num:3,', Weight
Value: ',data_value);
```

```
       writeln(' Go to training program, reduce value of offending WEIGTH then retrain.');
       writeln(' Please CONTACT a system technician.');
       writeln(' Strike ENTER to Continue...');
       sound(440); delay(350); nosound;
       readln;
    end;

end;

(* ============================================================== *)

procedure retrieve_nw2_text_file( var filename : string127 );

var
   i, j : integer;
   any_key     : char;
   filevar : text;
   thresh_trans : integer;
   file_weight,
   file_thresh : real;

begin
   {$I-}
   if paramcount = 1 then  (* If paramcount =1 then a user typed in a filename at the prompt. *)
   begin
      filename := paramstr(1); (*Get the user's command line filename *)
      writeln;
      writeln(' Using Command Line Weight Filename: ',filename); (* Tell the user you are using it. *)
      writeln;
   end
   else (* Filename was not found, use default *)
   begin
      writeln('*** ERROR! *** Weight File Name not FOUND!');
      sound(600); delay(200); nosound;
      filename := weight_filename; (* Default name  *)
      writeln(' Using Default Weight filename: ',filename);
      sound(600); delay(1000); nosound;
      writeln;
      writeln(' Strike ENTER to continue...');
      readln;
   end;
   writeln;
   writeln('The Filename to be read (*.NNE): ',filename); (* Display filename on the CRT *)
   writeln;

begin
      assign(filevar,filename); (*Open the file for reading *)
      reset(filevar);

(* Once again display important integerization information *)
      writeln;
      writeln('Integer Masks used for Integer Conversion');
      writeln;
      writeln('Hw_input_mask    : ',hw_input_mask:16);           (* Mx *)
```

```
writeln('Hw_L1_weight_mask : ',hw_L1_weight_mask:16);      (* Mw *)
writeln('Hw_L2_weight_mask : ',hw_L2_weight_mask:16);      (* Mw *)
writeln('Hw_tanh_in_mask   : ',hw_tanh_in_mask:16);
writeln('Hw_tanh_out_mask  : ',hw_tanh_out_mask:16);       (* My *)

writeln;
writeln('  Reading from the Weight file now.');
writeln;
writeln('  Node #1 is the first node in layer 1.');
delay(250);
writeln;
writeln('  Converting the Weights into Integer Values as they are read.');
writeln;

(* Read the layer 1 weight values from the weight file using for loops*)
for i := 1 to number_of_hw_nodes_L1 do  (* From 1 to the number of nodes in Layer 1 *)
begin
  for j := 1 to number_of_hw_inputs_L1 do (* From 1 to the number of inputs in layer 1 *)
  begin
    if j = 1 then     (* If reading the very first input then it is the bias input (thresh) *)
    begin
       readln(filevar,file_thresh);  (* Actually read the bias value from the weight file *)
       test_for_out_of_bounds_error( file_thresh,1,i,j); (* Test the bias value for error *)
       thresh_trans := trunc(hw_L1_weight_mask*(file_thresh));  (* Interigize the bias value *)
    end;
    if j > 1 then (* If not the first input, must be a weight value other than bias *)
    begin
       readln(filevar,file_weight); (* read the weight value from the file *)
       test_for_out_of_bounds_error( file_weight,1,i,j); (* Test the weight value for error *)
       (* Transfer the weight value to an array *)
       weight_trans_array[j - 1] := trunc(hw_L1_weight_mask*(file_weight)); (* Integerize it *)
    end;
    readln(filevar); (* Read the unneeded non-weight data *)
  end;
  (* Download the bias and weight array to the neural network board weight RAM blocks*)
  load_layer_N_by_node( $03, 1, (i - 1), number_of_hw_inputs_L1,
              weight_trans_array,
              thresh_trans);
end;

(* Read the layer 2 weight values from the weight file using for loops, also see comments above *)
for i := 1 to number_of_hw_nodes_L2 do  (* From 1 to the number of nodes in Layer 2 *)
begin
  for j := 1 to number_of_hw_inputs_L2 do
  begin
    if j = 1 then (* If reading the very first input then it is the bias input (thresh) *)
    begin
       readln(filevar,file_thresh);
       test_for_out_of_bounds_error( file_thresh,1,i,j);
       thresh_trans := trunc(hw_L2_weight_mask*(file_thresh));
    end;
    if j > 1 then
    begin
       readln(filevar,file_weight);
```

```
                test_for_out_of_bounds_error( file_weight,1,i,j);
                weight_trans_array[j - 1] := trunc(hw_L2_weight_mask*(file_weight));
            end;
            readln(filevar);
        end;
        (* Download the bias and weight array to the neural network board weight RAM blocks*)
        load_layer_N_by_node( $03, 2, (i - 1), number_of_hw_inputs_L2,
                    weight_trans_array,
                    thresh_trans);
    end;
    close(filevar); (* Done reading weight values, close the weight file *)

writeln;
    writeln(' The Weight File has been Loaded and Converted.');
    writeln;
    delay(150);
    writeln;
    writeln;

end; (* if filename <> '' *)

{$I+}
end; (* procedure retrieve_file *)

(****************************************************************************)
(*                                                                          *)
(* Load the Sigmoid (Squashing) LUT RAM with the function: hyperbolic tangent (TANH)  *)
(* In the process this function converts floating values into integer format.         *)
(*                                                                          *)
(*                                                                          *)
(*                                                                          *)
(****************************************************************************)

procedure load_tanh_sig_sram;

var
  offset : integer;
  temp   : integer;
  exp2   : real;
  tanh   : integer;

begin
  clrscr;
  writeln('Loading SIG SRAMS');
  writeln;
  port[NN_base_IO] := $07; (* Make sure counters are not loading *)

(* Using a 16 bit LUT, 16 bits in, 16 bits out *)
  for offset := -32767 to 32767 do (* *)
  begin
    (*Squashing LUT Page Selector I/O Port *)
    (* Enables SS RAM LUTS disables all other mem devices *)
    port[NN_base_IO + 3] := $FE; (*Start with Low Byte, FE = Low Byte*)
```

```
(* If x > 12 then tanh(x) = 1 (approx.) *)
if offset >= 12*hw_tanh_in_mask then
    tanh := hw_tanh_out_mask;

(* If x < -12 then tanh(x) = -1 (approx.) *)
if offset <= -12*hw_tanh_in_mask then
    tanh:= -hw_tanh_out_mask;

(* Note: tanh(x) = ((1.0 - exp(-2x))/(1.0 + exp(-2x))) *)
if (offset < 12*hw_tanh_in_mask) and (offset > -12*hw_tanh_in_mask )then
begin
    exp2 := exp(-2*(offset/hw_tanh_in_mask));
    tanh := trunc(hw_tanh_out_mask*((1.0 - exp2)/(1.0 + exp2)));
end;

(* Write Low Byte to LUT RAM*)
mem[NN_base_mem:offset] := 255 and tanh;

if (( offset mod 8000 ) = 0) then
begin
    textcolor(white);
    writeln('Offset: ',offset:6,'; Tanh: ',tanh:5,';   Low Calc: ',( 255 and tanh ):3,
        ' = Low RAM: ',mem[NN_base_mem:offset]:3);
    (* Check for Error *)
    if ( ( 255 and tanh ) <> mem[NN_base_mem:offset] ) then
    begin
        writeln;
        textcolor(white+ blink);
        writeln('******** ERROR IN SIG SRAM !!! ***********');
        textcolor(lightblue);
        writeln;
        writeln(' Memory does NOT read back correctly!');
        sound(400); delay(500); nosound; (* Beep the user *)
        readln; (* Wait for user to hit Enter from the keyboard*)
    end;
end;

(*Squashing LUT Page Selector I/O Port *)
port[NN_base_IO + 3] := $FD; (* Choose high byte page, FD = High Byte *)
mem[NN_base_mem:offset] := ( 255 and (tanh shr 8));

if (( offset mod 8000 ) = 0 ) then
begin
    textcolor(white);
    writeln('Offset: ',offset:6,'; Tanh: ',tanh:5,';  High Calc: ',( 255 and (tanh shr 8)):3,
        ' = High RAM: ',mem[NN_base_mem:offset]:3);
end;

end;

writeln('Sigmoid SRAMs loaded....');
port[NN_base_IO] := $07;
```

```
    (*Squashing LUT Page Selector I/O Port *)
    port[NN_base_IO + 3] := $FF; (* Turn off the PC bus access to the Squashing LUT RAMS*)

end;

(*************************************************************************)

procedure load_counters_lay1( input_num : word;
                number_of_nodes : byte );

begin
  dec(input_num);
  dec(number_of_nodes);

(* These I/O addresses are correctly labeled on Schematic.         *)
  port[NN_base_IO+8] := lo(input_num); (* Layer 1 Input Register, low order 8 bits of input address *)
  port[NN_base_IO+7] := number_of_nodes; (* Layer 1 Nodes Register Number of nodes per group *)
  port[NN_base_IO+9] := 0; (* Layer counter *)

(* load counters, pulse the load counter line via Master Control register *)
  port[NN_base_IO] := 6; (* First set bit one low *)
  port[NN_base_IO] := 7; (* Now set bit one high. Counters should be loaded now *)

writeln('**** Set Up Layer 1 Counters ****');
  writeln('IO Addresses - NN_base_IO: ',NN_base_IO );
  writeln;
  writeln('Desired Number of Inputs: ',input_num,' Actual Number of Inputs: ',lo(input_num));
  writeln('NN_base_IO+8: ',NN_base_IO+8);
  writeln;
  writeln('Number of Nodes per Group Node: ',number_of_nodes+1);
  writeln('NN_base_IO+7: ',NN_base_IO+7);
  writeln;
  delay(150);

end;

(*************************************************************************)

procedure load_counters_lay2( input_num : word;
                number_of_nodes : byte );
begin
  dec(input_num);
  dec(number_of_nodes);

(* Note: These addresses are correct and the addresses on the main schematic *)
(*       are incorrect.                                        *)
(*       The schematic says "NN_base_IO + $A" and it should be          *)
(*       "NN_base_IO + $10." Likewise for $B, it should be $11, and $C it *)
(*       is should be $12, and $D is $13, and $E is $14. Please make a note *)
(*       of this. 8/31/92 K.L.                           *)

port[NN_base_IO+$10] := lo(input_num); (* Layer 2 Input Register, low order 8 bits input address *)
  port[NN_base_IO+$11] := number_of_nodes; (* Layer 2 Node Register, Number of nodes per group *)
```

```
    port[NN_base_IO+$9] := 1; (* Layer Register *)

(* load counters, pulse the load counter line, U18-22 (Q1 -LOAD CNTRS) *)
    port[NN_base_IO] := 6; (* First set bit one low *)
    port[NN_base_IO] := 7; (* Counters should be loaded NOW *)

writeln('**** Set Up Layer 2 Counters ****');
    writeln('IO Addresses - NN_base_IO: ',NN_base_IO );
    writeln;
    writeln('Desired Number of Inputs: ',input_num,' Actual Number of Inputs: ',lo(input_num));
    writeln('NN_base_IO+$10: ',NN_base_IO+$10);
    writeln;
    writeln('Number of Nodes per Group Node: ',number_of_nodes+1);
    writeln('NN_base_IO+$11: ',NN_base_IO+$11);
    writeln;
    delay(150);

end;

(****************************************************************************)
(* bias  is sometimes called thresh in this documentation                 *)

procedure load_input_dprams_bias;

var
   offset : word;
   low_input_val,
   high_input_val : byte;
   int_16 : integer;

begin
   writeln;
   writeln(' Loading the Input Bias value into the Input RAM....');
   writeln;

port[NN_base_IO] := $37;
   (* Low order bias layer 1 into input dpram *)
   mem[NN_base_mem:($2000 + 160)] := (hw_input_mask) and $000000FF;

writeln(' LOW ORDER BIAS');
   writeln(' Input Mask: ',hw_input_mask);
   writeln(' NN Base Mem: ',NN_base_mem);
   writeln(' Offset: ',$2000 + 160);
   writeln(' Low Order Byte of Input Mask: ',(hw_input_mask) and $000000FF);
   writeln(' Value as Read Back from RAM: ',mem[NN_base_mem:($2000 + 160)]);
   writeln(' Note: Last two lines should match');

(* High order bias layer 1 into input dpram *)
   mem[NN_base_mem:($3000 + 160)] := ((hw_input_mask) shr 8) and $000000FF;

writeln;
   writeln(' HIGH ORDER BIAS');
   writeln(' Input Mask: ',hw_input_mask);
   writeln(' NN Base Mem: ',NN_base_mem);
```

```pascal
    writeln(' Offset: ',$3000 + 160);
    writeln(' High Order Byte of Input Mask: ',((hw_input_mask) shr 8) and $000000FF);
    writeln(' Value as Read Back from RAM: ',mem[NN_base_mem:($3000 + 160)]);
    writeln(' Note: Last two lines should match');

(**** SPECIAL:  Load in the Bias Input for Layer 2 in Input RAM ****)
    mem[NN_base_mem:$2800 + number_of_hw_inputs_L2 - 1] := hw_tanh_out_mask and $000000FF;
    mem[NN_base_mem:$3800 + number_of_hw_inputs_L2 - 1] := (hw_tanh_out_mask shr 8) and
$000000FF;
    writeln;
    writeln('Layer 1 and Layer 2 Input Bias Value is loaded in Input RAM');
    writeln;
end;

(***************************************************************************)

procedure test_input_rams;

var
    offset : word;
    lo_byte,
    hi_byte : word;
    input_word : word;

begin (* WARNING - Will overwrite the previous contents, including the Bias *)

writeln(' Writing and Reading to and from RAM, Previous contents are lost');
    writeln;
    write(' Stand By, Testing Input RAM..... ');

(* Run a simple test on the input RAM HW, to make sure they are working properly *)
    for offset := 0 to 255 do
    begin
        (*Mem is a predefined Turbo Pascal array that is used to access computer memory. Each *)
        (* component of the array is a byte. *)
        mem[NN_base_mem:$2000 + offset] := offset;
        mem[NN_base_mem:$3000 + offset] := offset;

lo_byte := 0;
        hi_byte := 0;
        delay(4);
        write('.');

lo_byte := mem[NN_base_mem:$2000 + offset];
        hi_byte := mem[NN_base_mem:$3000 + offset];

if ( ( lo_byte <> offset ) or ( hi_byte <> offset ) ) then
        begin
            writeln('     ***** INPUT RAM ERROR ***** ');
            writeln;
            writeln('          SEVERE ERROR! ');
```

```
        writeln;
        writeln('   Memory is not working properly');
        writeln;
        sound(440); delay(1000); nosound;
      end;
   end;
   writeln;
   writeln;
   writeln('Input RAM memory test is complete');
   writeln;
   writeln;
   sound(940); delay(50); nosound;
end;

(**************************************************************************)

begin
   clrscr;
   number_of_hw_inputs_L1 := 161; (*Number of Inputs for Layer 1 *)
   number_of_hw_inputs_L2 := 64;  (* Number of Inputs for Layer 2 *)

number_of_hw_nodes_L1 := 63;(* Number of Nodes in Layer 1 *)
   number_of_hw_nodes_L2 := 10;  (* Number of Nodes in Layer 2 *)

number_of_nodes_per_groupnode_L1 := 4; (* Number of Nodes handled by groupnodes in layer 1*)
   number_of_nodes_per_groupnode_L2 := 1; (* Number of Nodes handled by groupnodes in layer 2*)

image_width := 10;
   image_height := 16;

hw_L1_weight_mask := 16384;  (* Mw *)
   hw_L2_weight_mask := hw_L1_weight_mask; (* Mw *)
   hw_input_mask := 1024; (* Mx *)
   hw_tanh_out_mask := hw_input_mask; (* My=Mx *)
   hw_tanh_in_mask := hw_input_mask*hw_L1_weight_mask div 524288;  (* Mx X Mw /524288 *)

clrscr;  (* Display information on CRT *)
   textcolor(white);
   writeln;
   writeln('         Neural Network Hardware Loader/Initializer');
   writeln;
   writeln('      8/26/91, 10/24/91, 11/26/91, 8/28/92, 2/18/93, 6/10/93');
   writeln;
   writeln('               Rev. Date: ',rev_date);
   writeln;
   writeln(' Neural Net Board Base Segment Memory: ', NN_base_mem,' Base 10');
   writeln(' Neural Network Base I/O : ',NN_base_IO,' Base 10');
   writeln(' Number of hardware Inputs: ',number_of_hw_inputs_L1);
   writeln(' Number of Hardware 1st Layer Nodes: ',number_of_hw_nodes_L1);
   writeln(' Number of Outputs: ', number_of_hw_nodes_L2);
   writeln;

writeln('    a. Input RAM is tested');
   writeln('    b. Loads Sigmoid SRAM first to Enable Weight Memory');
```

```
writeln('     via Overlay Register');
writeln('  c. Weights Loaded in ASCII form from NeuralWare Prof II+');
writeln('  d. Board Counters are Loaded with Number of Inputs');
writeln('  e. The Bias is Loaded into Board RAM');
writeln;
writeln(' Watch for "Out of Bounds" Errors on the Weight values. It has been found');
writeln(' that out of bounds errors cause the Neural Net Accelerator Board to load');
writeln(' incorrectly causing a decrease in classification performance. ');
writeln;
writeln(' Strike the PAUSE key to hold screen.....');

sound(600); delay(250); nosound;

(* Do this hardware test first *)
test_input_rams;  (* Overwrites input RAM, previous contents are lost! *)

(* Load SIG LUT SRAMS with the squashing function*)
load_tanh_sig_sram;

(* Retrieve weights from the converted NeuralWare NeuralWorks Prof II+ *)
(* weight file. Make sure this is a simple DOS ASCII text file*)
retrieve_nw2_text_file(debug_filename);

(* Set up NN registers, Input Counter Latch, Layer Node Latches (NL1, NL2, NL3, NL4)  *)
load_counters_lay1( number_of_hw_inputs_L1,
          number_of_nodes_per_groupnode_L1 );
load_counters_lay2( number_of_hw_inputs_L2,
          number_of_nodes_per_groupnode_L2 );
(* Load the input bias values, sometimes called the threshhold or thresh values *)
load_input_dprams_bias;

writeln;
writeln(' The Neural Network Board is initialized and loaded with weights.');
writeln;
writeln(' Please run the real-time program (such as LEMREAD.EXE) to run the');
writeln(' neural network board.');

end.
```

A13

```
(* ============================================================ *)
(* Copyright © 1993 Eastman Kodak                               *)
(*                                                              *)
(*                                                              *)
(* Global Types and variable storage                            *)
(*                                                              *)
(* Require file for compiling and linking with the enclosed include file. *)
(*                                                              *)
(* ============================================================ *)

{$F+}
unit dbgglpt;

interface const
   max_nodes_in_layer_1 = 64;
   max_nodes_in_layer_2 = 10;
   max_number_of_inputs = 161;

(* DO NOT CHANGE - Image Lib Type!!!! *)
   max_number_of_image_pixels = 160;

type
   image_input_and_output_file_type = array[1..2, 1..max_number_of_image_pixels] of real;
   image_150_file_type = array[1..2, 1..150] of real;

(******** Real Layer One definitions ********)
   layer_one_vector_type = array[1..max_number_of_inputs] of real;

(******* Integer Layer 1 Definitions ********)
   layer_one_vector_type_int = array[1..max_number_of_inputs] of longint;

vector_type = array[1..max_nodes_in_layer_1] of real;

vector_type_int = array[1..max_nodes_in_layer_1] of longint;

image_disp_type = array[1..max_number_of_inputs] of integer;

large_array_type = array[0..20,0..30] of byte; (* Used with imagds20 *)
   medium_array_type = array[0..9,0..14] of integer; (* used with imagds20 *)

index_array = array[0..max_number_of_inputs] of integer;
   input_array_type = array[0..max_number_of_inputs] of integer;

image_byte_type = array[0..10000] of byte;

byte_file_type = file of byte;

var
``` input_values : layer_one_vector_type;

exit_prog : boolean;

image_width, image_height : integer;

medium_image_window : medium_array_type; (* used with imagds20 *)

hw_input_mask,
hw_L1_weight_mask,
hw_L2_weight_mask : longint;
hw_tanh_out_mask,
hw_tanh_in_mask : integer;

weight_trans_array : layer_one_vector_type_int;

image_input_and_output : image_input_and_output_file_type;

hw_output_vector : input_array_type;
decoded_hw_output : integer;

(* Number of inputs at each layer *)
number_of_hw_inputs_L1,
number_of_hw_inputs_L2 :word;

(* The values of the inputs for each layer *)
input_value_array : input_array_type;

number_of_nodes_per_groupnode_L1,
number_of_nodes_per_groupnode_L2 : byte;

number_of_hw_nodes_L1,
number_of_hw_nodes_L2 : word;

answer : char;

base_IO : word ;
implementation end. (* unit global - GLOBALS *)
□

We claim:

1. A neural network based optical character recognition system for extracting and classifying characters disposed on a moving web of material, said recognition system comprising:

- image acquisition means defining an imaging window, said image acquisition means being positionable such that said characters pass through said defined imaging window, said image acquisition means extracting and accumulating image data on a web character passing through said imaging window;
- a light source for providing illumination of said web character as said web character passes through said defined imaging window;
- neural network accelerator means coupled to said image acquisition means for processing accumulated image data on said web character passing through said imaging window according to a predefined multilayer neural network, and for producing therefrom character classification information, said neural network accelerator means including:
  - dual-ported memory means receiving said accumulated image data from said image acquisition means, said dual-ported memory means having a first portion and a second portion, said first portion of said dual-ported memory means initially storing said accumulated image data, and n processing nodes connected in parallel to receive from said first portion and simultaneously process image data at different nodes for an input layer in said multilayer neural network, an output of each processing node for said input layer being stored in said second portion of said memory means, n being an integer$\geq 1$, said first portion and second portion subsequently storing processing node outputs for alternate layers of said multilayer neural network, respectively; and
  - classification means coupled to said neural network accelerator means for classifying said web character imaged by said image acquisition means using the corresponding character classification information produced by said neural network accelerator means.

2. The recognition system of claim 1, wherein said image acquisition means comprises a line scan CCD camera with a view lens which serves to define said imaging window, and wherein said web passes through said defined imaging window substantially orthogonal to an optical axis of said camera.

3. The recognition system of claim 2, wherein said multilayer neural network comprises a fully interconnected, multilayer feedforward neural network.

4. The recognition system of claim 1, further comprising means for switching inputs to said n processing nodes from said first portion of said dual-ported memory means to said second portion thereof once processing of accumulated image data of all nodes in said input layer of said multilayer neural network is completed.

5. The recognition system of claim 4, wherein the output of each node during processing of data by the n nodes of a second layer of said multilayer neural network is overwritten into said first portion of said memory means.

6. The recognition system of claim 5, wherein the outputs of said parallel connected processing nodes for each layer of said multilayer neural network are stored in a selected one of said first portion and said second portion of said dual-ported memory means, the selected memory means portion being other than said portion of said dual-ported memory means containing the input data to the parallel processing nodes for said layer, said input data for said layer comprising the stored processing node outputs for the previous layer in the multilayer neural network.

7. The recognition system of claim 1, wherein the outputs of said processing nodes are passed through sigmoid function processing means for data squashing prior to being stored in said memory means.

8. The recognition system of claim 1, further comprising a dedicated, parallel-configured bus for transferring said accumulated image data from said image acquisition means to said dual-ported memory means of said neural network accelerator means.

9. The recognition system of claim 8, further comprising a multiplexer and a system data bus, said multiplexer being disposed within said neural network accelerator means and connected to each of said dedicated parallel input bus and said system data bus for multiplexing of image data from either one of said buses into said memory means.

10. The recognition system of claim 1, wherein each of said n parallel connected processing nodes comprises a multiplier/accumulator logic circuit having two inputs and one output, a first one of said inputs being connected to said memory means and a second one of said inputs being connected to a unique system memory address which contains predefined weighting factors for corresponding processing nodes in the respective layers of the multilayer neural network.

11. The recognition system of claim 1, further comprising control logic for controlling the flow of data within said neural network accelerator means, said neural network accelerator means comprising a neural network accelerator board.

12. The recognition system of claim 1, further comprising means for preprocessing said image data accumulated by said image acquisition means prior to processing of said data by said neural network accelerator means, said preprocessor means including means for noise filtering and means for formatting said image data.

13. The recognition system of claim 12, wherein said noise filtering means and formatting means of said preprocessor means include:

- thresholding means for filtering invalid image data information;
- dilation and compression means for simultaneously representing said accumulated image data in a dilated compressed form; and
- means for converting said compressed image data into a predefined format for acceptance by said neural network accelerator means.

14. The recognition system of claim 13, wherein said simultaneous dilation and compression means includes a plurality of multiple input OR gates, each of said OR gates being connected to receive input pixels from scan lines of said image acquisition means.

15. The recognition system of claim 14, wherein each of said OR gates is connected to receive four input pixels from adjacent scan lines, two of said input pixels being obtained from each of said scan lines.

16. The recognition system of claim 12, wherein said image acquisition means includes a frame grabber memory means, said frame grabber memory means being coupled to an input of said preprocessor means, said frame grabber memory means receiving accumulated image data to be preprocessed by said preprocessing means.

17. The recognition system of claim 1, wherein said moving web of material comprises a moving web of photographic material and wherein said light source provides infrared transmissive illumination to said web as said web passes through said defined imaging window.

18. The recognition system of claim 1, wherein said characters disposed on said moving web of material comprise edgemarkings, each of said edgemarkings being assembled into one of a plurality of groupings each of which is indexed with a special message character, the distance in each grouping to each character from said respective special message character being known, and wherein said system further comprises:

means for identifying said special message characters; and encoder means for clocking the web distance from each identified special message character, said encoder means providing a collect image trigger signal to said image acquisition means once a known distance to a character from said special message character is reached.

19. The recognition system of claim 18, wherein said encoder means includes an optical shaft encoder disposed in communication with said moving web of material.

20. The recognition system of claim 1, wherein said classification means includes a processor for formatting said classification information produced by said neural network accelerator means into ASCII code, and wherein said system further comprises communication means for facilitating transfer of said ASCII coded classification information to a host computer for at least one of process accounting and process control.

21. The recognition system of claim 1, wherein said system further comprises at least one of display means for viewing said classified web characters, and storage means for storing said classification information on said web characters.

22. The recognition system of claim 1, wherein said characters comprise dot matrix-type printed characters.

23. The recognition system of claim 22, wherein said printed characters to be extracted and classified are edgemarked on said web and comprise at least one of machine information, roll information and footage information for said moving web of material.

24. The recognition system of claim 23, wherein said web of material comprises photographic material, and wherein said dot matrix print characters are semi-transparent and wherein said photographic material is semi-transparent.

25. The recognition system of claim 24, wherein said characters comprise machine printed numeric characters.

26. A method for extracting and classifying characters disposed on a moving web of material using a multilayer neural network, said method comprising the steps of:

(a) passing said moving web through a predefined imaging window;

(b) illuminating said web within said imaging window simultaneous with said passing step (a);

(c) acquiring an image of said web within said imaging window simultaneous with said passing step (a);

(d) extracting and accumulating image data on characters disposed on said web imaged in said step (c); and (e) utilizing a multilayer neural network to process image data accumulated in said step (d), said multilayer neural network producing character classification information based upon accumulated image data, said utilizing step including:

for each layer of said multilayer neural network, processing data by n nodes thereof in parallel, n being an integer $\leq 1$;

utilizing a memory storage having a first portion and a second portion for simultaneously providing input data and storing output data for each respective layer of said multilayer neural network;

initially storing in the first portion of said memory storage said image data accumulated in said step (d);

during processing of accumulated image data received from said first portion by n nodes of an input layer of said multilayer neural network, storing the output of said n nodes into said second portion of said memory storage; and for each network layer subsequent said input layer, alternately coupling one of said second portion and said first portion of the memory storage as an input to said n nodes, and storing the output of said n nodes into the other of said memory storage portions not containing the input data thereto.

27. The method of claim 26, further comprising the step of processing said character classification information into a corresponding ASCII code.

28. The method of claim 26, further comprising the step of predefining said neural network utilized in said step (e) using a multilayer back-propagation training technique.

29. The method of claim 26, wherein said step (c) comprises acquiring an optical image of said web within said imaging window simultaneous with said passing step (a).

30. The method of claim 26, wherein said neural network comprises a fully interconnected, multilayer neural network.

31. The method of claim 26, further comprising the step of preprocessing said image data prior to said step (e), said preprocessing including substantially simultaneously dilating and compressing said image data to a dilated compressed form.

32. The method of claim 31, wherein said simultaneous dilation and compression includes passing said image data through a plurality of parallel disposed OR gates.

33. The method of claim 26, wherein said web comprises a photographic material and said illuminating step (b) includes illuminating said web within said predefined imaging window with infrared transmissive lighting.

34. A neural network accelerator for processing input data in a feed forward operational mode according to a predefined multilayer neural network, said accelerator comprising:

memory means divided into a first memory portion and a second memory portion, said input data being initially received and stored by said first memory portion of said memory means;

n parallel connected processing nodes for receiving and processing as a first network layer said input data stored in said first memory portion, each of said processing nodes being coupled to provide first layer output data to said second memory portion of said memory means for storage, n being an integer $\leq 1$; and means for switching processing node inputs from said first memory portion of said memory means to said second memory portion of said memory means upon completion of said input data processing as said first network layer by said n parallel connected processing nodes, whereby the first layer output data stored by said second memory portion is input from said second memory portion to said n parallel connected processing nodes for processing as a second network layer.

35. The neural network accelerator of claim 34, wherein the outputs of said n parallel connected processing nodes during data processing as a second layer of said multilayer neural network are overwritten into said first memory portion of said memory means.

36. The neural network accelerator of claim 35, wherein said switching means further comprises means for switching the processing node inputs from said second memory portion to said first memory portion for data processing by said n parallel connected processing nodes as a third layer of said multilayer neural network.

* * * * *

UNITED STATES PATENT AND TRADEMARK OFFICE
CERTIFICATE OF CORRECTION

PATENT : 5,712,922

DATED : January 27, 1998

INVENTOR(S) : Kenneth H. Loewenthal, et al.

It is certified that error appears in the above-identified patent and that said Letters Patent is hereby corrected as shown below:

Column 61, line 67, "an integer $\leq 1$;" should be --an integer $\geq 1$;--

Column 62, line 55, "an integer $\leq 1$;" should be --an integer $\geq 1$;--

Signed and Sealed this

Twelfth Day of May, 1998

BRUCE LEHMAN

*Attest:*

*Attesting Officer*  *Commissioner of Patents and Trademarks*